US008210291B2

(12) United States Patent
Matsubara et al.

(10) Patent No.: US 8,210,291 B2
(45) Date of Patent: Jul. 3, 2012

(54) CONTROL APPARATUS AND CONTROL METHOD FOR POWER TRANSMISSION APPARATUS FOR VEHICLE

(75) Inventors: Tooru Matsubara, Toyota (JP); Kenta Kumazaki, Toyota (JP); Atsushi Tabata, Okazaki (JP); Masakazu Kaifuku, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 772 days.

(21) Appl. No.: 12/314,659

(22) Filed: Dec. 15, 2008

(65) Prior Publication Data
US 2009/0152029 A1 Jun. 18, 2009

(30) Foreign Application Priority Data

Dec. 18, 2007 (JP) ................................ 2007-326616

(51) Int. Cl.
*B60W 20/00* (2006.01)
(52) U.S. Cl. ...................... 180/65.265; 180/285; 477/19
(58) Field of Classification Search ............. 180/65.285, 180/65.28, 65.265; 477/19, 20
See application file for complete search history.

(56) References Cited

U.S. PATENT DOCUMENTS

| 5,842,949 | A * | 12/1998 | Kuriyama ........................ 477/63 |
| 6,380,641 | B2 * | 4/2002 | Matsubara et al. ......... 290/40 C |
| 6,494,809 | B1 * | 12/2002 | Suzuki et al. ................ 477/107 |
| 6,561,295 | B1 * | 5/2003 | Kuroda et al. ............. 180/65.25 |
| 6,621,244 | B1 * | 9/2003 | Kiyomiya et al. ............ 318/611 |
| 6,640,917 | B2 * | 11/2003 | Maruyama .................... 180/65.6 |
| 7,018,315 | B2 * | 3/2006 | Endo et al. ........................ 475/88 |
| 7,178,618 | B2 * | 2/2007 | Komeda et al. .......... 180/65.275 |
| 7,194,348 | B2 * | 3/2007 | Wada et al. ....................... 701/55 |
| 7,249,642 | B2 * | 7/2007 | Tabata et al. ............. 180/65.275 |
| 7,322,902 | B2 * | 1/2008 | Tabata et al. ....................... 477/4 |
| 7,549,945 | B2 * | 6/2009 | Shibata et al. ..................... 477/5 |
| 7,566,288 | B2 * | 7/2009 | Tabata et al. ....................... 477/4 |
| 7,578,765 | B2 * | 8/2009 | Tabata et al. ....................... 477/5 |
| 7,670,258 | B2 * | 3/2010 | Kamada et al. ................. 477/77 |
| 7,722,497 | B2 * | 5/2010 | Tabata et al. ....................... 477/3 |
| 7,749,131 | B2 * | 7/2010 | Imamura et al. ................... 477/3 |
| 7,828,695 | B2 * | 11/2010 | Inoue et al. ........................ 477/34 |

(Continued)

FOREIGN PATENT DOCUMENTS

JP   A-2005-264762   9/2005

(Continued)

OTHER PUBLICATIONS

Japanese Office Action dated Mar. 5, 2012 (issued Mar. 13, 2012) in Japanese Patent Application No. 2007-326616 (with translation).

*Primary Examiner* — Jeffrey J Restifo
(74) *Attorney, Agent, or Firm* — Oliff & Berridge, PLC

(57) ABSTRACT

A control apparatus for a power transmission apparatus for a vehicle controls the rotational speed of an output shaft of an electric differential portion to a predetermined rotational speed until at least one of a control that starts a main power source and a control that stops the main power source ends, if at least one of a shift position and a shift range is changed from a parking position to a neutral position while the at least one of the control that starts the main power source and the control that stops the main power source is being executed.

20 Claims, 9 Drawing Sheets

U.S. PATENT DOCUMENTS

| | | | |
|---|---|---|---|
| 7,874,956 B2 * | 1/2011 | Kouno | 477/5 |
| 7,909,728 B2 * | 3/2011 | Tabata et al. | 477/3 |
| 7,922,617 B2 * | 4/2011 | Matsubara et al. | 477/3 |
| 7,935,015 B2 * | 5/2011 | Tabata et al. | 475/5 |
| 7,955,215 B2 * | 6/2011 | Shibata | 477/3 |
| 7,959,535 B2 * | 6/2011 | Matsubara et al. | 477/3 |
| 7,998,021 B2 * | 8/2011 | Matsubara et al. | 477/3 |
| 7,998,022 B2 * | 8/2011 | Matsubara et al. | 477/5 |

FOREIGN PATENT DOCUMENTS

| | | |
|---|---|---|
| JP | A-2007-290630 | 11/2007 |

\* cited by examiner

|  | C1 | C2 | B1 | B2 | B3 | SPEED RATIO | STEP |
|---|---|---|---|---|---|---|---|
| 1st | O |  |  |  | O | 3.357 | 1.54 |
| 2nd | O |  |  | O |  | 2.180 | 1.53 |
| 3rd | O |  | O |  |  | 1.424 | 1.42 |
| 4th | O | O |  |  |  | 1.000 | TOTAL 3.36 |
| R |  | O |  |  | O | 3.209 | |
| N |  |  |  |  |  |  | |

O CIRCLE: ENGAGED

CONTROL APPARATUS AND CONTROL METHOD FOR POWER TRANSMISSION APPARATUS FOR VEHICLE

INCORPORATION BY REFERENCE

The disclosure of Japanese Patent Application No. 2007-326616 filed on Dec. 18, 2007 including the specification, drawings and abstract is incorporated herein by reference in its entirety.

BACKGROUND OF THE INVENTION

1. Field of the Invention

The invention relates to a power transmission apparatus for a vehicle, which includes an electric differential portion in which a difference between the rotational speed of an input shaft connected to a main power source and the rotational speed of an output shaft is controlled by controlling the operating state of a motor connected to a rotational element of a differential mechanism. More specifically, the invention relates to a technology in which if a shift position is changed from a parking position to a neutral position while executing a control that starts or stops the main power source, a control that changes the load of the main power source, or the like, a decrease in starting performance/stopping performance of the main power source, and deterioration of noise/vibration characteristics (NV characteristics) are suppressed.

2. Description of the Related Art

A power transmission apparatus for a vehicle, which includes an electric differential portion, is available. In the electric differential portion, a difference between the rotational speed of an input shaft connected to a main power source and the rotational speed of an output shaft is controlled by controlling the operating state of a motor connected to a rotational element of a differential mechanism. An example of the power transmission apparatus for a vehicle is a drive apparatus for a vehicle described in Japanese Patent Application Publication No. 2005-264762 (JP-A-2005-264762). In the publication JP-A-2005-264762, the electric differential portion mainly includes a planetary gear unit, a first motor, and a second motor. A sun gear of the planetary gear unit is connected to the first motor. A carrier of the planetary gear unit is connected to an engine (the main power source). A ring gear of the planetary gear unit is connected to the second motor. It is possible to control the rotational speed of each rotational element of the planetary gear unit, by controlling the first motor and the second motor. The publication JP-A-2005-264762 also describes a technology in which the main power source is quickly started by quickly increasing the rotational speed of the main power source to an ignition rotational speed at which ignition can be performed, using the second motor and/or the first motor.

In the power transmission apparatus for a hybrid vehicle, which includes the electric differential portion, for example, the power transmission apparatus described in the publication JP-A-2005-264762, when the shift position is the parking position, a load operation of the main power source, an idling operation of the main power source, or the like is performed, for example, to start/stop the main power source, or to generate electric power. To appropriately control the load operation of the main power source, the idling operation of the main power source, or the like, a fixing control that fixes the output shaft of the electric differential portion using the second motor is executed When the shift position is the neutral position, the main power source is not started/stopped, and the load operation of the main power source is not performed. That is, when the shift position is the neutral position, the fixing control that fixes the output shaft of the electric differential portion using the second motor is not executed.

In the drive apparatus for a vehicle described in the publication JP-A-2005-264762, for example, if the shift position is changed from the parking position to the neutral position while executing the control that starts or stops the main power source, the fixing control using the second motor ends. Therefore, the second motor is rotated, and the starting performance and the stopping performance of the main power source may decrease. Also, if the shift position is changed from the parking position to the neutral position while the load operation of the main power source is being performed, the rotational speed of the main power source may fluctuate due to the rotation of the second motor, and the noise/vibration characteristics (NV characteristics) may deteriorate. A method has not been devised to suppress the decrease in the starting performance and the stopping performance of the main power source, and the deterioration of the noise/vibration characteristics if the shift position is changed from the parking position to the neutral position while the main power source is being started or stopped, or the load operation of the main power source is being performed.

SUMMARY OF THE INVENTION

The invention provides a control apparatus and a control method for a power transmission apparatus for a vehicle, which includes an electric differential portion in which a difference between the rotational speed of an input shaft connected to a main power source and the rotational speed of an output shaft is controlled by controlling the operating state of a motor connected to a rotational element of a differential mechanism. If a shift position is changed from a parking position to a neutral position while executing a control that starts or stops the main power source, a control that changes the load of the main power source, or the like, the control apparatus suppresses a decrease in starting performance/stopping performance of the main power source, and deterioration of noise/vibration characteristics (NV characteristics).

A first aspect of the invention relates to a control apparatus for a power transmission apparatus for a vehicle, which includes an electric differential portion in which a difference between a rotational speed of an input shaft connected to a main power source and a rotational speed of an output shaft is controlled by controlling an operating state of a motor connected to a rotational element of a differential mechanism. The control apparatus includes an output-shaft rotational speed control portion that controls the rotational speed of the output shaft of the electric differential portion to a predetermined rotational speed until at least one of a control that starts the main power source and a control that stops the main power source ends, if at least one of a shift position and a shift range is changed from a parking position to a neutral position while the at least one of the control that starts the main power source and the control that stops the main power source is being executed.

A second aspect of the invention relates to a control apparatus for a power transmission apparatus for a vehicle, which includes an electric differential portion in which a difference between a rotational speed of an input shaft connected to a main power source and a rotational speed of an output shaft is controlled by controlling an operating state of a motor connected to a rotational element of a differential mechanism. The control apparatus includes an output-shaft rotational speed control portion that controls the rotational speed of the output shaft of the electric differential portion to a predetermined rotational speed until a change in a load of the main power source ends, if at least one of a shift position and a shift range is changed from a parking position to a neutral position while the load of the main power source is being changed.

A third aspect of the invention relates to a method of controlling a power transmission apparatus for a vehicle, which includes an electric differential portion in which a difference between a rotational speed of an input shaft connected to a main power source and a rotational speed of an output shaft is controlled by controlling an operating state of a motor connected to a rotational element of a differential mechanism. The method includes determining whether at least one of a shift position and a shift range is a parking position; determining whether a load of the main power source is being changed, if it is determined the at least one of the shift position and the shift range is the parking position; and controlling the rotational speed of the output shaft of the electric differential portion to a predetermined rotational speed, if it is determined that the load of the main power source is being changed.

The control apparatus for the power transmission apparatus for a vehicle according to the first aspect includes the output-shaft rotational speed control portion that controls the rotational speed of the output shaft of the electric differential portion to the predetermined rotational speed until at least one of the control that starts the main power source and the control that stops the main power source ends, if at least one of the shift position and the shift range is changed from the parking position to the neutral position while the at least one of the control that starts the main power source and the control that stops the main power source is being executed. Therefore, even if at least one of the shift position and the shift range is changed to the neutral position, the rotational speed of the output shaft of the electric differential portion continues to be controlled. Accordingly, the main power source is quickly started or stopped. Thus, it is possible to suppress a decrease in the starting performance/stopping performance of the main power source.

The control apparatus for the power transmission apparatus for a vehicle according to the second aspect includes the output-shaft rotational speed control portion that controls the rotational speed of the output shaft of the electric differential portion to the predetermined rotational speed until a change in the load of the main power source ends, if at least one of the shift position and the shift range is changed from the parking position to the neutral position during the change in the load of the main power source. Therefore, even if at least one of the shift position and the shift range is changed from the parking position to the neutral position, the rotational speed of the output shaft of the electric differential portion continues to be controlled. Accordingly, the change in the load of the main power source quickly ends. Thus, it is possible to suppress the fluctuation of the rotational speed of the main power source, and deterioration of the noise/vibration characteristics (the NV characteristics) are suppressed.

BRIEF DESCRIPTION OF THE DRAWINGS

The foregoing and/or further objects, features and advantages of the invention will become more apparent from the following description of embodiment with reference to the accompanying drawings, in which like numerals are used to represent like elements and wherein.

DETAILED DESCRIPTION OF EMBODIMENTS

Hereinafter, an embodiment of the invention will be described in detail with reference to the drawings.

Figures 1, 2:
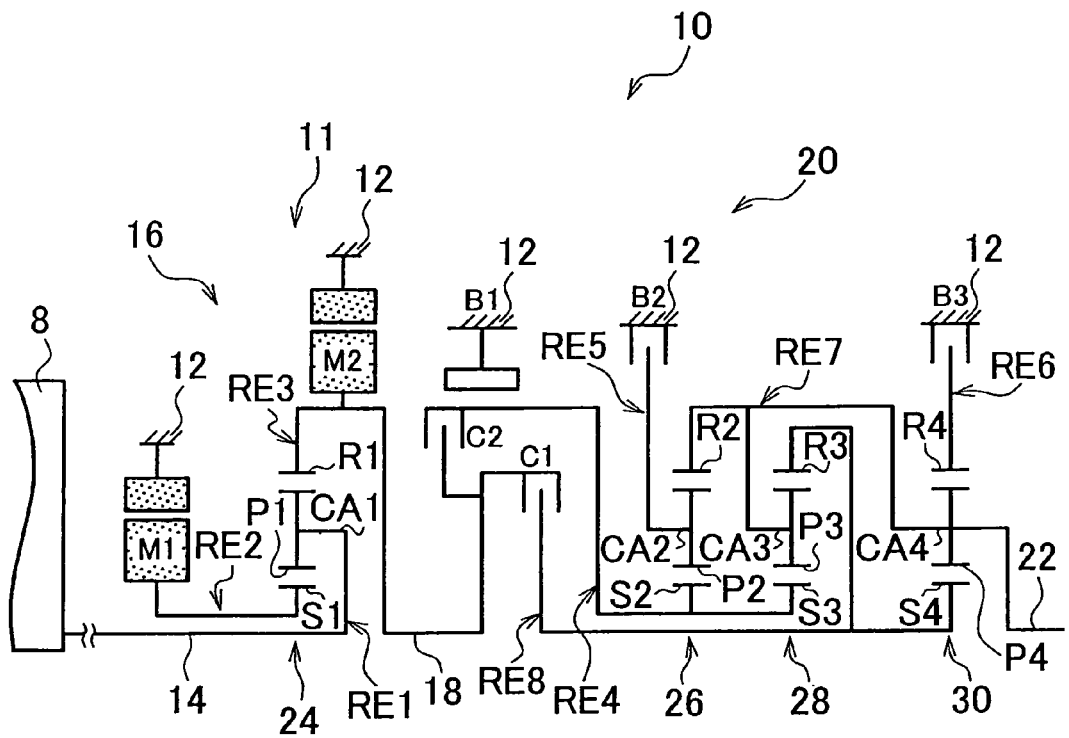
FIG. 1 is a schematic diagram explaining the configuration of a drive apparatus for a hybrid vehicle according to an embodiment of the invention.
FIG. 2 is an operation table explaining the combinations of operations of hydraulic frictional engagement elements used in the shift operation of the drive apparatus in FIG. 1.

FIG. 1 is a schematic diagram explaining a shift mechanism 10 that constitutes a part of a drive apparatus for a hybrid vehicle to which the invention is applied. In FIG. 1, the shift mechanism 10 includes an input shaft 14, a differential portion 11, an automatic shift portion 20, and an output shaft 22 that are provided in series on a common axis in a transmission case (hereinafter, simply referred to as "case") 12. The transmission case 12, which is a non-rotational member, is fitted to a vehicle body. The input shaft 14 is an input rotational member. The differential portion 11, which is a CVT portion, is directly connected to the input shaft 14, or connected to the input shaft 14 via a pulsation absorption damper (i.e., a vibration-damping device; not shown) or the like. The automatic shift portion 20 is a power transmission portion. The automatic shift portion 20 is provided in a power transmission path between the differential portion 11 and drive wheels 34 (refer to FIG. 7), and connected in series to the differential portion 11 via a transmitting member (transmitting shaft) 18. The output shaft 22, which is an output rotational member, is connected to the automatic shift portion 20. For example, the shift mechanism 10 is provided in a front-engine rear-wheel-drive vehicle where an engine is longitudinally disposed. The shift mechanism 10 is provided in the power transmission path between an internal combustion engine (hereinafter, simply referred to as "engine") 8 such as a gasoline engine or a diesel engine, and a pair of drive wheels 34. The engine 8 is a drive power source for driving the vehicle, which is directly connected to the input shaft 14, or connected to the input shaft 14 via the pulsation absorption damper (not shown). The shift mechanism 10 transmits power from the engine 8 to the pair of drive wheels 34 via a differential gear unit (final reducer) 32 (refer to FIG. 7), a pair of axles, and the like, which constitute a part of the power transmission path. The engine 8 in the embodiment may be regarded as the main power source according to the invention. The shift mechanism 10 may be regarded as the power transmission apparatus for a vehicle according to the invention. The differential portion 11 may be regarded as the electric differential portion according to the invention.

Thus, the engine 8 is directly connected to the differential portion 11 in the shift mechanism 10 in the embodiment. That is, the engine 8 is connected to the differential portion 11 without providing a fluid transmission device such as a torque converter or a fluid coupling between the engine 8 and the differential portion 11. For example, when the engine 8 is connected to the differential portion 11 via the above-described pulsation absorption damper, it is regarded that the engine 8 is directly connected to the differential portion 11. Because the configuration of the shift mechanism 10 is symmetric with respect to the axis thereof, the lower portion of the shift mechanism 10 is omitted in the schematic diagram in FIG. 1 and FIG. 7.

The differential portion 11 includes a first motor M1, a power split mechanism 16, and a second motor M2. The power split mechanism 16 is a mechanical mechanism that mechanically distributes the output from the engine 8, which is input to the input shaft 14. That is, the power split mechanism 16 is a differential mechanism that distributes the output from the engine 8 to the first motor M1 and the transmitting member 18. The second motor M2 is operatively connected to the transmitting member 18 so that the second motor M2 is rotated integrally with the transmitting member 18. Each of the first motor M1 and the second motor M2 in the embodiment is a so-called motor-generator that has the function of generating electric power (power-generation function). The first motor M1 has at least the power-generation function for bearing a reaction force. The second motor M2 has at least a motor function for outputting the drive power as the drive power source. The transmitting member 18 in the embodiment may be regarded as the output shaft according to the invention. The first motor M1 may be regarded as the motor according to the invention. The second motor M2 may be regarded as the output-shaft-connected motor according to the invention.

The power split mechanism 16 mainly includes a first planetary gear unit 24. The first planetary gear unit 24 is of a single pinion type, and has a predetermined gear ratio $\rho 1$ of, for example, approximately "0.418". The first planetary gear unit 24 includes a first sun gear S1, a first planetary gear P1, a first carrier CA1, and a first ring gear R1, which are rotational elements (elements). The first carrier CA1 supports the first planetary gear P1 so that the first planetary gear P1 rotates on its axis, and moves around the first sun gear S1. The first ring gear R1 engages with the first sun gear S1 via the first planetary gear P1. The gear ratio $\rho 1$ is equal to ZS1/ZR1. In this equation, ZS1 represents the number of teeth of the first sun gear S1, and ZR1 represents the number of teeth of the first ring gear R1.

In the power split mechanism 16, the first carrier CA1 is connected to the input shaft 14, that is, the engine 8. The first sun gear S1 is connected to the first motor M1. The first ring gear R1 is connected to the transmitting member 18. When the three elements of the first planetary gear unit 24, that is, the first sun gear S1, the first carrier CA1, and the first ring gear R1 can be rotated relative to each other, the power split mechanism 16 with the above-described configuration is placed in a differential mode in which the differential operation can be performed, that is, the differential operation is performed. Thus, the output from the engine 8 is distributed to the first motor M1 and the transmitting member 18. Also, electric energy is generated by the first motor M1 using part of the output from the engine 8 that is distributed to the first motor M1, and the generated electric energy is accumulated, or used to rotate the second motor M2. Thus, the differential portion 11 (the power split mechanism 16) functions as an electric differential device. Accordingly, for example, the differential portion 11 is placed in a so-called continuously-variable transmission (CVT) mode (electric CVT mode). That is, the differential portion 11 continuously changes the rotational speed of the transmitting member 18, regardless of the rotational speed of the engine 8. That is, the differential portion 11 functions as the electric CVT in which a speed ratio $\gamma 0$ (the rotational speed $N_{IN}$ of the input shaft 14/the rotational speed $N_{18}$ of the transmitting member 18) is continuously changed from the minimum value $\gamma 0min$ to the maximum value $\gamma 0max$. Thus, the power split mechanism 16 (the differential portion 11) is caused to function as a CVT mechanism in which a difference between the rotational speed of the input shaft and the rotational speed of the transmitting member 18 that functions as the output shaft is controlled, by controlling the operating states of the first motor M1, the second motor M2, and the engine 8 that are connected to the power split mechanism 16 (the differential portion 11).

The automatic shift portion 20, which functions as a shift portion, is a stepped automatic transmission that constitutes a part of the power transmission path from the differential portion 11 to the drive wheels 34. The automatic shift portion 20 includes a second planetary gear unit 26 of a single pinion type, a third planetary gear unit 28 of a single pinion type, and a fourth planetary gear unit 30 of a single pinion type. The automatic shift portion 20 functions as a stepped automatic transmission. That is, the automatic shift portion 20 is a planetary gear type automatic transmission in which a plurality of gears can be achieved. The second planetary gear unit 26 includes a second sun gear S2, a second planetary gear P2, a second carrier CA2, and a second ring gear R2. The second carrier CA2 supports the second planetary gear P2 such that the second planetary gear P2 rotates on its axis, and moves around the second sun gear S2. The second ring gear R2 engages with the second sun gear S2 via the second planetary gear P2. The second planetary gear unit 26 has a predetermined gear ratio $\rho 2$ of, for example, approximately "0.562". The third planetary gear unit 28 includes a third sun gear S3, a third planetary gear P3, a third carrier CA3, and a third ring gear R3. The third carrier CA3 supports the third planetary gear P3 such that the third planetary gear P3 rotates on its axis, and moves around the third sun gear S3. The third ring gear R3 engages with the third sun gear S3 via the third planetary gear P3. The third planetary gear unit 28 has a predetermined gear ratio ρ3 of, for example, approximately "0.425". The fourth planetary gear unit 30 includes a fourth sun gear S4, a fourth planetary gear P4, a fourth carrier CA4, and a fourth ring gear R4. The fourth carrier CA4 supports the fourth planetary gear P4 such that the fourth planetary gear P4 rotates on its axis, and moves around the fourth sun gear S4. The fourth ring gear R4 engages with the fourth sun gear S4 via the fourth planetary gear P4. The fourth planetary gear unit 30 has a predetermined gear ratio ρ4 of, for example, approximately "0.421". The gear ratio ρ2 is equal to ZS2/ZR2. In this equation, ZS2 represents the number of teeth of the second sun gear S2, and ZR2 represents the number of teeth of the second ring gear R2. The gear ratio ρ3 is equal to ZS3/ZR3. In this equation, ZS3 represents the number of teeth of the third sun gear S3. ZR3 represents the number of teeth of the third ring gear R3. The gear ratio ρ4 is equal to ZS4/ZR4. In this equation, ZS4 represents the number of teeth of the fourth sun gear S4. ZR4 represents the number of teeth of the fourth ring gear R4.

In the automatic shift portion 20, the second sun gear S2 and the third sun gear S3, which are integrally connected to each other, are selectively connected to the transmitting member 18 via the second clutch C2. Also, the second sun gear S2 and the third sun gear S3 are selectively connected to the case 12 via the first brake B1. The second carrier CA2 is selectively connected to the case 12 via the second brake B2. The fourth ring gear R4 is selectively connected to the case 12 via the third brake B3. The second ring gear R2, the third carrier CA3, and the fourth carrier CA4, which are integrally connected to each other, are connected to the output shaft 22. The third ring gear R3 and the fourth sun gear S4, which are integrally connected to each other, are selectively connected to the transmitting member 18 via the first clutch C1.

Thus, the automatic shift portion 20 is selectively connected to the differential portion 11 (the transmitting member 18) via the first clutch C1 or the second clutch C2 that is used to achieve the gear of the automatic shift portion 20. In other words, each of the first clutch C1 and the second clutch C2 functions as an engagement device that selectively switches the state of the power transmission path between the transmitting member 18 and the automatic shift portion 20, that is, the power transmission path from the differential portion 11 (the transmitting member 18) to the drive wheels 34. The state of the power transmission path is selectively changed between a power-transmission permitted state and a power-transmission interrupted state. When the power transmission path is in the power-transmission permitted state, the transmission of power is permitted. When the power transmission path is in the power-transmission interrupted state, the transmission of power is interrupted. That is, when at least one of the first clutch C1 and the second clutch C2 is engaged, the power transmission path is placed in the power-transmission permitted state. When the first clutch C1 and the second clutch C2 are disengaged, the power transmission path is placed in the power-transmission interrupted state.

When a hydraulic frictional engagement device that needs to be disengaged (hereinafter, referred to as "disengagement-side engagement device") is disengaged, and a hydraulic frictional engagement device that needs to be engaged (hereinafter, referred to as "engagement-side engagement device") is engaged in the automatic shift portion 20, a clutch-to-clutch shift is performed. As a result, one of the first gear to the fourth gear, or the reverse gear, or the neutral state is achieved. Thus, the speed ratio γ (=the rotational speed $N_{18}$ of the transmitting member 18/the output-shaft rotational speed $N_{OUT}$ of the output shaft 22) at each gear is achieved. The speed ratio γ changes substantially geometrically. As shown in an engagement operation table in FIG. 2, for example, when the shift mechanism 10 functions as the stepped transmission, the first gear, at which a speed ratio γ1 is set to the maximum value, for example, approximately "3.357", is achieved by engaging the first clutch C1 and the third brake B3. The second gear, at which a speed ratio γ2 is set to a value smaller than the speed ratio γ1, for example, approximately "2.180", is achieved by engaging the first clutch C1 and the second brake 132. The third gear, at which a speed ratio γ3 is set to a value smaller than the speed ratio γ2, for example, approximately "1.424", is achieved by engaging the first clutch C1 and the first brake B1. The fourth gear, at which a speed ratio γ4 is set to a value smaller than the speed ratio γ3, for example, approximately "1.000", is achieved by engaging the first clutch C1 and the second clutch C2. The "reverse gear", at which a speed ratio γR is set to a value between the speed ratios γ1 and γ2, for example, approximately "3.209", is achieved by engaging the second clutch C2 and the third brake B3. The neutral state "N" is achieved by disengaging the first clutch C1, the second clutch C2, the first brake B1, the second brake B2, and the third brake B3.

The first clutch C1, the second clutch C2, the first brake B1, the second brake B2, and the third brake B3 (hereinafter, collectively referred to as "clutches C" and "brakes B" unless a specific clutch or a specific brake needs to be distinguished from the other clutches or the other brakes) are hydraulic frictional engagement devices that are generally used in automatic transmissions in related technologies. Each of the clutches C and the brakes B may be a wet multiple disc type clutch and brake in which a plurality of stacked frictional plates are pressed by a hydraulic actuator. Each of the brakes B may be a band brake in which one or two bands is (are) wound around the outer peripheral surface of a drum that is rotated, and the end(s) of the one or two bands is (are) tightened by a hydraulic actuator. Each of the clutches C and the brakes B selectively connects members that are provided on both sides thereof. The first clutch C1, the second clutch C2, the first brake B1, the second brake B2, and the third brake B3 may be regarded as the engagement elements according to the invention.

In the shift mechanism 10 that has the above-described configuration, the CVT is formed by combining the differential portion 11 that functions as the CVT with the automatic shift portion 20. When the speed ratio of the differential portion 11 is controlled to be constant, the stepped transmission is substantially formed by combining the differential portion 11 with the automatic shift portion 20.

More specifically, when the differential portion 11 functions as the CVT, and the automatic shift portion 20, which is connected to the differential portion 11 in series, functions as the stepped transmission, the rotational speed input to the automatic shift portion 20 (hereinafter, referred to as "input rotational speed for the automatic shift portion 20") at least one gear M of the automatic shift portion 20, that is, the rotational speed of the transmitting member 18 (hereinafter, referred to as "transmitting-member rotational speed $N_{18}$") is continuously changed. As a result, the speed ratio is continuously changed in a certain range at the at least one gear M. Accordingly, the total speed ratio γT of the shift mechanism 10 (=the rotational speed N1 of the input shaft 14/the rotational speed $N_{OUT}$ of the output shaft 22) is continuously changed. Thus, the CVT is formed in the shift mechanism 10.

The total speed ratio γT of the shift mechanism 10 is determined based on the speed ratio γ0 of the differential portion 11 and the speed ratio γ of the automatic shift portion 20.

For example, the transmitting-member rotational speed $N_{18}$ is continuously changed at each of the first gear to the fourth gear, and the reverse gear of the automatic shift portion 20 shown in the engagement operation table in FIG. 2. Thus, the speed ratio is continuously changed in a certain range at each of the first gear to the fourth gear, and the reverse gear. As a result, the speed ratio is continuously changed between the first gear and the second gear, between the second gear and the third gear, and between the third gear and the fourth gear. Accordingly, the total speed ratio γT of the entire shift mechanism 10 is continuously changed.

When the speed ratio of the differential portion 11 is controlled to be constant, and the clutches C and the brakes B are selectively engaged to selectively achieve any one of the first gear to the fourth gear, and the reverse gear, the total speed ratio γT of the entire shift mechanism 10 at each gear is achieved. The total speed ratio γT changes substantially geometrically. Accordingly, in the shift mechanism 10, the stepped transmission is substantially formed.

For example, when the speed ratio γ0 of the differential portion 11 is controlled to be fixed to "1", the total speed ratio γT of the shift mechanism 10 at each of the first gear to the fourth gear, and the reverse gear of the automatic shift portion 20 is achieved, as shown in the engagement operation table in FIG. 2. When the speed ratio γ0 of the differential portion 11 is fixed to a value smaller than "1", for example, approximately 0.7, at the fourth gear of the automatic shift portion 20, the total speed ratio γT is set to a value smaller than "1" at the fourth gear, for example, approximately "0.7".

Figure 3:
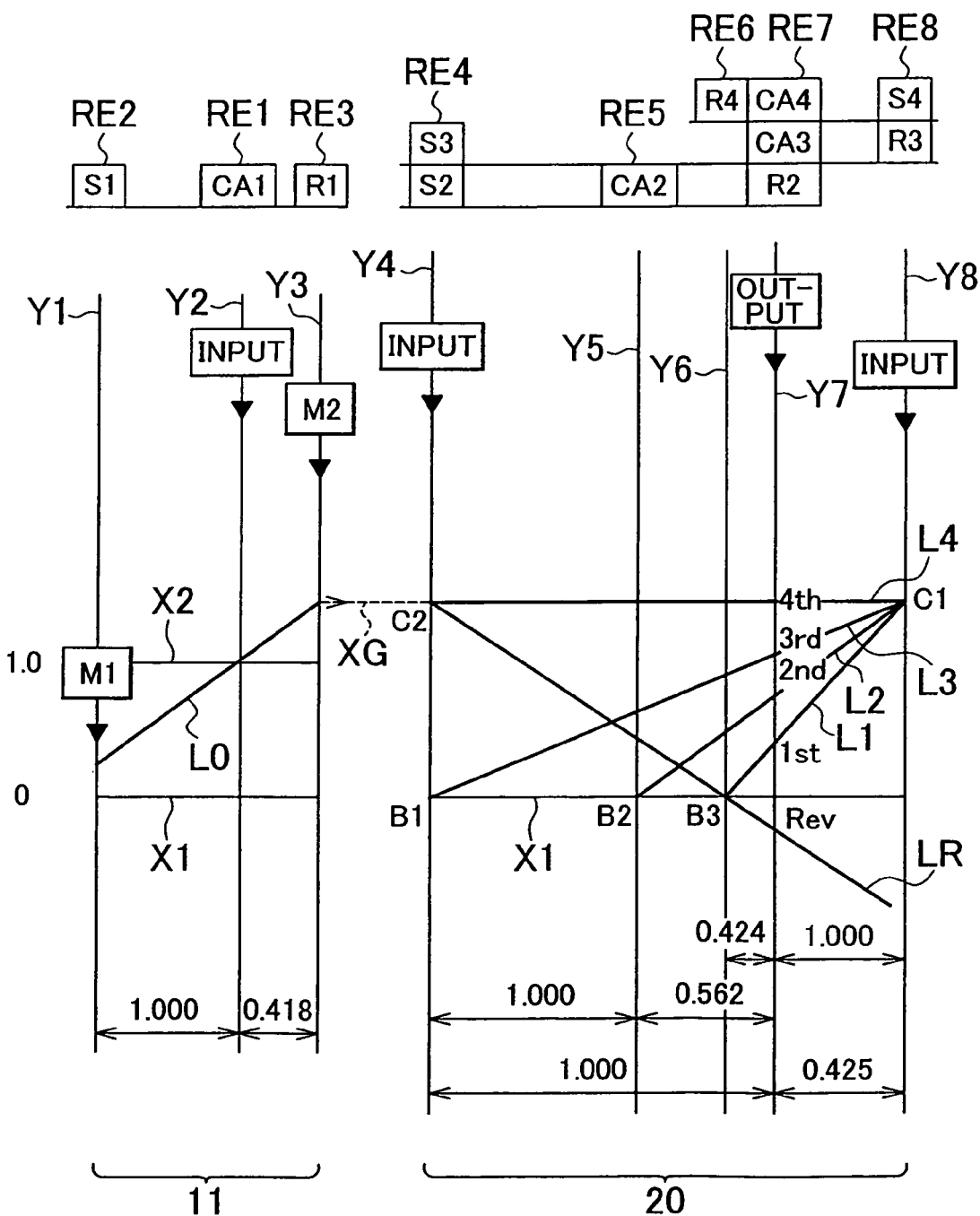
FIG. 3 is a collinear diagram explaining the relative rotational speeds at each gear in the drive apparatus in FIG. 1.

FIG. 3 is a collinear diagram in which straight lines indicate the relative relation among the rotational speeds of the rotational elements in the shift mechanism 10 that includes the differential portion 11 and the automatic shift portion 20. Each of the rotational elements is in a connected state or disconnected state at each gear. The collinear diagram in FIG. 3 is a two-dimensional coordinate. In the collinear diagram in FIG. 3, the axis of abscissa indicates the relation among the gear ratios ρ (ρ1, ρ2, ρ3, and ρ4) of the planetary gear units 24, 26, 28, and 30, and the axis of ordinate indicates relative rotational speeds. The horizontal Line X1 among the three horizontal lines indicates the rotational speed of "0". The horizontal line X2 indicates the rotational speed of "1.0", that is, a rotational speed $N_E$ of the engine 8 connected to the input shaft 14. The horizontal line XG indicates the rotational speed of the transmitting member 18.

The three vertical lines Y1, Y2, and Y3 indicate the relative rotational speeds of the three rotational elements of the power split mechanism 16 that constitutes the differential portion 11. That is, the vertical line Y1 indicates the relative rotational speed of the first sun gear S1 that is regarded as a second rotational element (second element) RE2. The vertical line Y2 indicates the relative rotational speed of the first carrier CA1 that is regarded as a first rotational element (first element) RE1. The vertical line Y3 indicates the relative rotational speed of the first ring gear R1 that is regarded as a third rotational element (third element) RE3. The intervals between the vertical lines Y1 and Y2, and between the vertical lines Y2 and Y3 are set based on the gear ratio ρ1 of the first planetary gear unit 24. Further, the five vertical lines Y4, Y5, Y6, Y7, and Y8 indicate the relative rotational speeds of the rotational elements of the automatic shift portion 20. That is, the vertical line Y4 indicates the relative rotational speed of the second sun gear S2 and the third sun gear S3, which are connected to each other, and which are regarded as a fourth rotational element (fourth element) RE4. The vertical line Y5 indicates the relative rotational speed of the second carrier CA2 that is regarded as a fifth rotational element (fifth element) RE5. The vertical line Y6 indicates the relative rotational speed of the fourth ring gear R4 that is regarded as a sixth rotational element (sixth element) RE6. The vertical line Y7 indicates the relative rotational speed of the second ring gear R2, the third carrier CA3, and the fourth carrier CA4, which are connected to each other, and which are regarded as a seventh rotational element (seventh element) RE7. The vertical line Y8 indicates the relative rotational speed of the third ring gear R3 and the fourth sun gear S4, which are connected to each other, and which are regarded as an eighth rotational element (eighth element) RE8. The intervals between the vertical lines are set based on the gear ratios ρ2 of the second planetary gear unit 26, the gear ratio ρ3 of the third planetary gear unit 28, and the gear ratio ρ4 of the fourth planetary gear unit 30. In the collinear diagram, the interval between the sun gear and the carrier is set to indicate "1". The interval between the carrier and the ring gear is set to indicate the gear ratio ρ (ρ1, ρ2, ρ3, or ρ4). That is, in the differential portion 11, the interval between the vertical lines Y1 and Y2 is set to indicate "1", and the interval between the vertical lines Y2 and Y3 is set to indicate the gear ratio ρ1. In the automatic shift portion 20, the interval between the sun gear and the carrier in each of the second planetary gear unit 26, the third planetary gear unit 28, and the fourth planetary gear unit 30 is set to indicate "1". The interval between the carrier and the ring gear in each of the second planetary gear unit 26, the third planetary gear unit 28, and the fourth planetary gear unit 30 is set to indicate the gear ratio ρ (ρ2, ρ3, or ρ4).

As shown in the collinear diagram in FIG. 3, in the power splint mechanism 16 (the differential portion 11) in the shift mechanism 10 in the embodiment, the first rotational element RE1 (the first carrier CA1) is connected to the input shaft 14, that is, the engine 8, and the second rotational element RE2 is connected to the first motor M1, and the third rotational element (the first ring gear R1) RE3 is connected to the transmitting member 18 and the second motor M2. Thus, the rotation of the input shaft 14 is transmitted (input) to the automatic shift portion 20 via the transmitting member 18. In this case, the oblique straight line L0 that passes through the intersection of the lines Y2 and X2 indicates the relation between the rotational speed of the first sun gear S1 and the rotational speed of the first ring gear R1.

For example, the differential portion 11 may be placed in the differential mode so that the first rotational element RE1 to the third rotational element RE3 can be rotated relative to each other, and the rotational speed of the first ring gear R1, which depends on the vehicle speed V, may be substantially constant. In this case, when the rotational speed of the first carrier CA1 is increased or decreased by controlling the engine speed $N_E$, the rotational speed of the first sun gear S1, that is, the rotational speed of the first motor M1 is increased or decreased. The rotational speed of the first ring gear R1 is indicated by the intersection of the straight line L0 and the vertical line Y3. The rotational speed of the first carrier CA1 is indicated by the intersection of the straight line L0 and the vertical line Y2. The rotational speed of the first sun gear S1 is indicated by the intersection of the straight line L0 and the vertical line Y1.

When the rotational speed of the first sun gear S1 is made equal to the rotational speed of the engine speed $N_E$ by controlling the rotational speed of the first motor M1 so that the speed ratio γ0 of the differential portion 11 is fixed to "1", the straight line L0 matches the horizontal line X2. Thus, the transmitting member 18 is rotated such that the rotational speed of the first ring gear R1 is equal to the engine speed $N_E$. When the rotational speed of the first sun gear S1 is made 0 by controlling the rotational speed of the first motor M1 so that the speed ratio γ0 of the differential portion 11 is fixed to a value smaller than "1", for example, approximately 0.7, the transmitting member 18 is rotated at the transmitting-member rotational speed $N_{18}$, which is higher than the engine speed $N_E$.

In the automatic shift portion 20, the fourth rotational element RE4 is selectively connected to the transmitting member 18 via the second clutch C2, and selectively connected to the case 12 via the first brake B1. The fifth rotational element RE5 is selectively connected to the case 12 via the second brake B2. The sixth rotational element RE6 is selectively connected to the case 12 via the third brake B3. The seventh rotational element RE7 is connected to the output shaft 22. The eighth rotational element RE8 is selectively connected to the transmitting member 18 via the first clutch C1.

When the rotational speed of the transmitting member 18 (the third rotational element RE3), which is the output rotational member of the differential portion 11, is input to the eighth rotational element RE8 by engaging the first clutch C1, the rotational speed of the output shaft 22 at the first gear is indicated by the intersection of the oblique straight line L1 and the vertical line Y7 in the automatic shift portion 20, as shown in FIG. 3. The straight line L1 is set by engaging the first clutch C1 and the third brake B3. The straight line L1 passes through the intersection of the vertical line Y8 that indicates the rotational speed of the eighth rotational element RE8 and the horizontal line XG, and the intersection of the vertical line Y6 that indicates the rotational speed of the sixth rotational element RE6 and the horizontal line X1. The vertical line Y7 indicates the rotational speed of the seventh rotational element RE7 connected to the output shaft 22. Similarly, the rotational speed of the output shaft 22 at the second gear is indicated by the intersection of the oblique straight line L2 and the vertical line Y7. The straight line L2 is set by engaging the first clutch C1 and the second brake B2. The rotational speed of the output shaft 22 at the third gear is indicated by the intersection of the oblique straight line L3 and the vertical line Y7. The straight line L3 is set by engaging the first clutch C1 and the first brake B1. The rotational speed of the output shaft 22 at the fourth gear is indicated by the intersection of the horizontal straight line L4 and the vertical line Y7. The straight line L4 is set by engaging the first clutch C1 and the second clutch C2.

Figure 4:
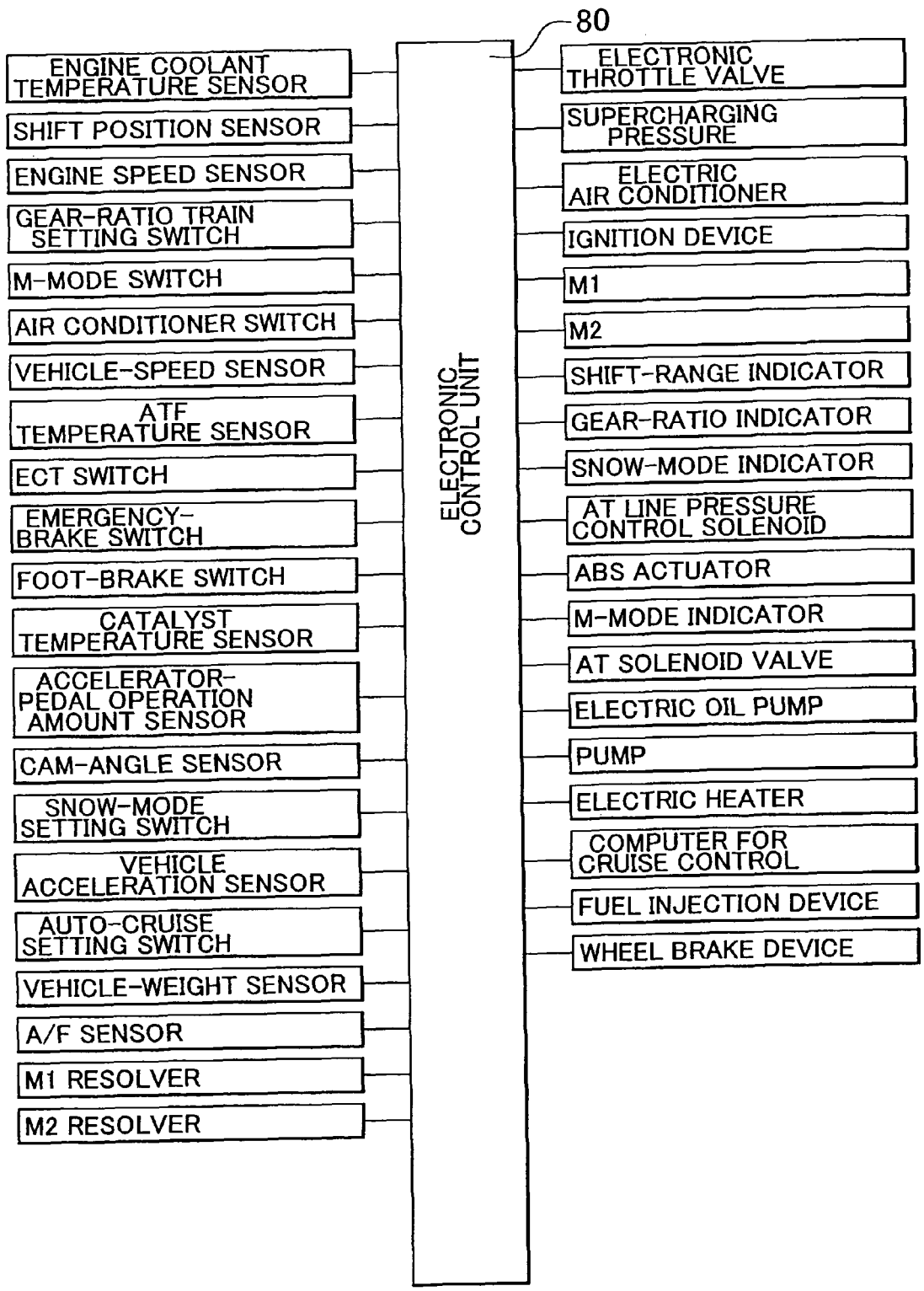
FIG. 4 is a diagram explaining signals input to and output from an electronic control unit provided for the drive apparatus in FIG. 1.

FIG. 4 shows signals that are input to an electronic control unit 80, and signals that are output from the electronic control unit 80 to control the shift mechanism 10 in the embodiment. The electronic control unit 80 includes a so-called microcomputer that includes a CPU, ROM, RAM, and an input/output interface. The electronic control unit 80 executes a hybrid drive control relating to the engine 8, and the first and second motors M1 and M2, and a drive control including a shift control on the automatic shift portion 20, by processing the signals according to programs that are prestored in the ROM, using the temporary storage function of the RAM.

The electronic control unit 80 receives the signals from sensors and switches shown in FIG. 4. That is, the electronic control unit 80 receives a signal indicating an engine coolant temperature $TEMP_W$, a signal indicating a shift position SP at which a shift lever 52 (refer to FIG. 6) is placed, a signal indicating the number of times that the shift lever 52 is operated at the position "M", a signal indicating the engine speed $N_E$ that is the rotational speed of the engine 8, a signal indicating a gear-ratio train set value, a signal providing an instruction for a manual mode (M-mode), a signal indicating the operation of an air conditioner, a signal indicating the vehicle speed V which corresponds to the rotational speed $N_{OUT}$ of the output shaft 22 (hereinafter, referred to as "output-shaft rotational speed $N_{OUT}$"), a signal indicating the temperature $T_{OIL}$ of hydraulic oil in the automatic shift portion 20, a signal indicating the operation of an emergency brake, a signal indicating the operation of a foot brake, a signal indicating a catalyst temperature, a signal indicating the operation amount of an accelerator pedal (i.e., an accelerator-pedal operation amount Acc) which corresponds to the amount of output required by a driver, a signal indicating a cam angle, a signal indicating the setting of a snow mode, a signal indicating longitudinal acceleration G, a signal indicating an auto cruise mode, a signal indicating the weight of the vehicle, a signal indicating the wheel speed of each wheel, a signal indicating the rotational speed $N_{M1}$ of the first motor M1 (hereinafter, referred to as "first-motor rotational speed $N_{M1}$"), a signal indicating the rotational speed $N_{M2}$ of the second motor NM (hereinafter, referred to as "second-motor rotational speed $N_{M2}$", a signal indicating the state of charge SOC in an electric power storage device 56 (refer to FIG. 7), and the like.

The electronic control unit 80 outputs control signals to an engine output control device 58 (refer to FIG. 7) that controls the output from the engine 8. For example, the electronic control unit 80 outputs a drive signal to a throttle actuator 64 to control the throttle-valve opening amount $\theta_{TH}$ of an electronic throttle valve 62 provided in the intake pipe 60 of the engine 8, a fuel-supply amount signal that controls the amount of fuel supplied by a fuel injection device 66 to the intake pipe 60 or the cylinder of the engine 8, and an ignition signal that provides an instruction for the timing at which an ignition device 68 ignites the fuel in the engine 8. The electronic control unit 80 also outputs a supercharging-pressure adjustment signal that adjusts supercharging pressure, an electric air-conditioner drive signal that operates the electric air conditioner, an instruction signal that provides an instruction for the operation of the motors M1 and M2, a shift position (operational position) indication signal that operates a shift indicator, a gear-ratio indication signal that causes a gear-ratio indicator to indicate the gear ratio, a snow-mode indication signal that causes a snow-mode indicator to indicate that the snow mode is selected, an ABS operation signal that operates an ABS (anti-locking braking system) actuator that prevents the slip of the wheels at the time of braking, a M-mode indication signal that causes a M-mode indicator to indicate that the M-mode is selected, a valve-instruction signal that operates electromagnetic valves (linear solenoid valves) in a hydraulic control circuit 70 (refer to FIG. 5 and FIG. 7) to control hydraulic actuators for the hydraulic frictional engagement devices in the differential portion 11 and the automatic shift portion 20, a signal for regulating a line pressure $P_L$ using a regulator valve provided in the hydraulic control circuit 70, a drive instruction signal that operates an electric hydraulic pump for supplying a hydraulic pressure that is used as a basic pressure when the line pressure $P_L$ is regulated, a signal that drives an electric heater, a signal for a computer used for the cruise control, and the like.

Figure 5:
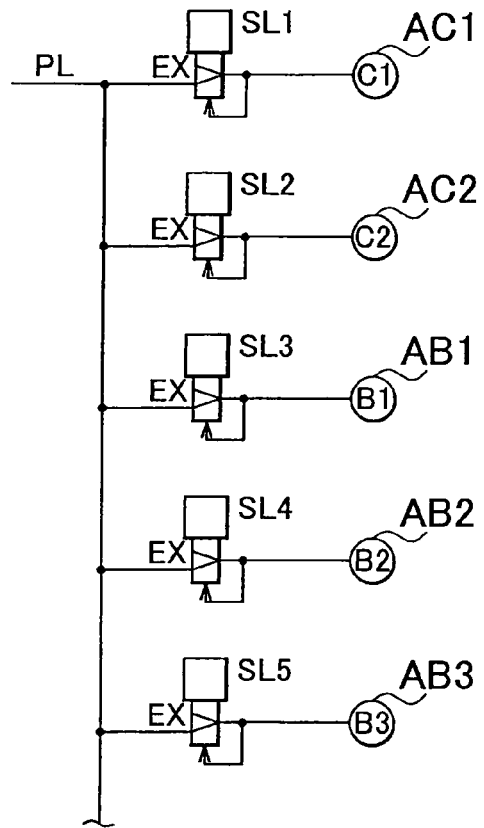
FIG. 5 is a circuit diagram relating to linear solenoid valves that control hydraulic actuators for clutches C and brakes B, in a hydraulic control circuit.

FIG. 5 is a circuit diagram relating to linear solenoid valves SL1 to SL5 in the hydraulic control circuit 70. The linear solenoid valves SL1 to SL5 controls the operations of hydraulic actuators (hydraulic cylinders) $A_{C1}$, $A_{C2}$, $A_{B1}$, $A_{B2}$, and $A_{B3}$ for the clutches C1 and C2, and the brakes B1 to B3, respectively.

In FIG. 5, according to instruction signals from the electronic control unit 80, the linear solenoid valves SL1 to SL5 regulate engagement pressures $P_{C1}$, $P_{C2}$, $P_{B1}$, $P_{B2}$, and $P_{B3}$, respectively, using the line pressure $P_L$. Then, the engagement pressures $P_{C1}$, $P_{C2}$, $P_{B1}$, $P_{B2}$, and $P_{B3}$ are directly supplied to the actuators $A_{C1}$, $A_{C2}$, $A_{B1}$, $A_{B2}$, and $A_{B3}$, respectively. For example, the relief regulator valve regulates the line pressure $P_L$ to a value according to an engine load or the like represented by the accelerator-pedal operation amount or a throttle-valve opening amount, using a hydraulic pressure generated by a mechanical oil pump rotated by an electric oil pump (not shown) or the engine 8, as a basic pressure.

The linear solenoid valves SL1 to SL5 basically have the same configuration. The electronic control unit 80 energizes/de-energizes the linear solenoid valves SL1 to SL5, independently. Thus, the hydraulic pressures for the hydraulic actuators $A_{C1}$, $A_{C2}$, $A_{B1}$, $A_{B2}$, and $A_{B3}$ are regulated independently. Accordingly, the engagement pressures $P_{C1}$, $P_{C2}$, $P_{B1}$, $P_{B2}$, and $P_{B3}$ for the clutches C1 to C4, and the brakes B1 and B2 are controlled. In the automatic shift portion 20, each gear is achieved by engaging predetermined engagement devices, for example, as shown in the engagement operation table in FIG. 2. In the shift control on the automatic shift portion 20, for example, engagement and disengagement of the clutch C and the brake B relating to the shift are simultaneously controlled, that is, the so-called clutch-to-clutch shift is performed.

Figure 6:
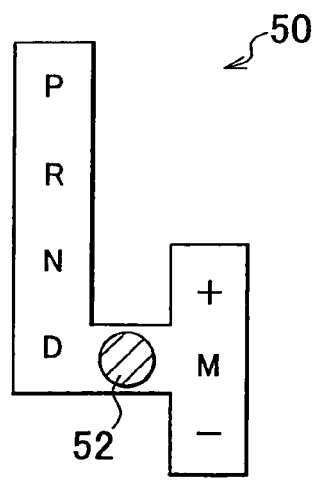
FIG. 6 shows an example of a shift operation device that includes a shift lever, and that is operated to select a shift position among a plurality of positions.

FIG. 6 is an example of a diagram showing a shift operation device 50. The shift operation device 50 is a switching device that switches the shift position SP among a plurality of positions according to the operation performed by the driver. The shift operation device 50 is provided, for example, on the side of a driver's seat. The shift operation device 50 includes the shift lever 52 that is operated to select a shift range, that is, the shift position SP among the plurality of positions.

The shift lever 52 is manually moved to one of a parking position "P (Parking)", a reverse position "R (Reverse)", a neutral position "N (Neutral)", an automatic-shift forward-travel position "D (Drive)", and a manual-shift forward-travel position "M (Manual)". When the shift lever 52 is at the position "P (Parking)", the transmission of power is interrupted in the power transmission path in the shift mechanism 10, that is, in the automatic shift portion 20 so that the shift mechanism 10 is in the neutral state, and the output shaft of the automatic shift portion 20 is locked. When the shift lever 52 is at the position "R (Reverse)", the vehicle backs up. When the shift lever 52 is at the position "N (Neutral)", the transmission of power is interrupted in the power transmission path in the shift mechanism 10 so that the shift mechanism 10 is placed in the neutral state. When the shift lever 52 is at the position "D (Drive)", an automatic shift mode is selected, and an automatic shift control is executed to achieve the total speed ratio γT of the shift mechanism 10 in a range in which the total speed ratio γT can be changed. The total speed ratio γT is determined based on the speed ratio of the differential portion 11 and the speed ratio of the automatic shift portion 20 at each gear. The speed ratio of the differential portion 11 is continuously changed in a certain range. The gear of the automatic shift portion 20 is selected among the first gear to the fourth gear by the automatic shift control. When the shift lever 52 is at the position "M (Manual)", a manual shift mode (manual mode) is selected to set so-called shifting ranges by restricting the use of the high gear(s) of the automatic shift portion 20 that is (are) used in the automatic shift control.

When the shift lever 52 is manually moved to the shift position SP among the above-described positions, for example, the state of the hydraulic control circuit 70 is electrically changed to select one of the reverse gear "R", the neutral state "N", the gears in the forward gear "D", and the like shown in the engagement operation table in FIG. 2.

Among the positions "P" to "M", each of the positions "P" and "N" is a non-travel position that is selected to stop the vehicle from traveling. When the shift lever 52 is at the position "P" or "N", for example, both of the first clutch C1 and the second clutch C2 are disengaged, as shown in the engagement operation table in FIG. 2. That is, each of the positions "T" and "N" is a non-drive position for switching the state of the power transmission path in the automatic shift portion 20 to the power-transmission interrupted state by disengaging the first clutch C1 and the second clutch C2 so that the transmission of the power is interrupted in the power transmission path and the vehicle cannot be driven. Each of the positions "R", "D", and "M" is a travel position that is selected to cause the vehicle to travel. When the shift lever 52 is at the position "R", "D", or "M", for example, at least one of the first clutch C1 and the second clutch C2 is engaged as shown in the engagement operation table in FIG. 2. That is, each of the positions "R", "D", and "M" is a drive position for switching the state of the power transmission path in the automatic shift portion 20 to the power-transmission permitted state by engaging the first clutch C1 and/or the second clutch C2 so that the transmission of power is permitted in the power transmission path and the vehicle can be driven.

More specifically, when the shift lever 52 is manually moved from the position "P" or "N" to the position "R", the state of the power transmission path in the automatic shift portion 20 is changed from the power-transmission interrupted state to the power-transmission permitted state by engaging the second clutch C2. When the shift lever 52 is manually moved from the position "N" to the position "D", the state of the power transmission path in the automatic shift portion 20 is changed from the power-transmission interrupted state to the power-transmission permitted state by engaging at least the first clutch C1. When the shift lever 52 is manually moved from the position "R" to the position "P" or "N", the state of the power transmission path in the automatic shift portion 20 is changed from the power-transmission permitted state to the power-transmission interrupted state by disengaging the second clutch C2. When the shift lever 52 is manually moved from the position "D" to the position "N", the state of the power transmission path in the automatic shift portion 20 is changed from the power-transmission permitted state to the power-transmission interrupted state by disengaging the first clutch C1 and the second clutch C2.

Figure 7:
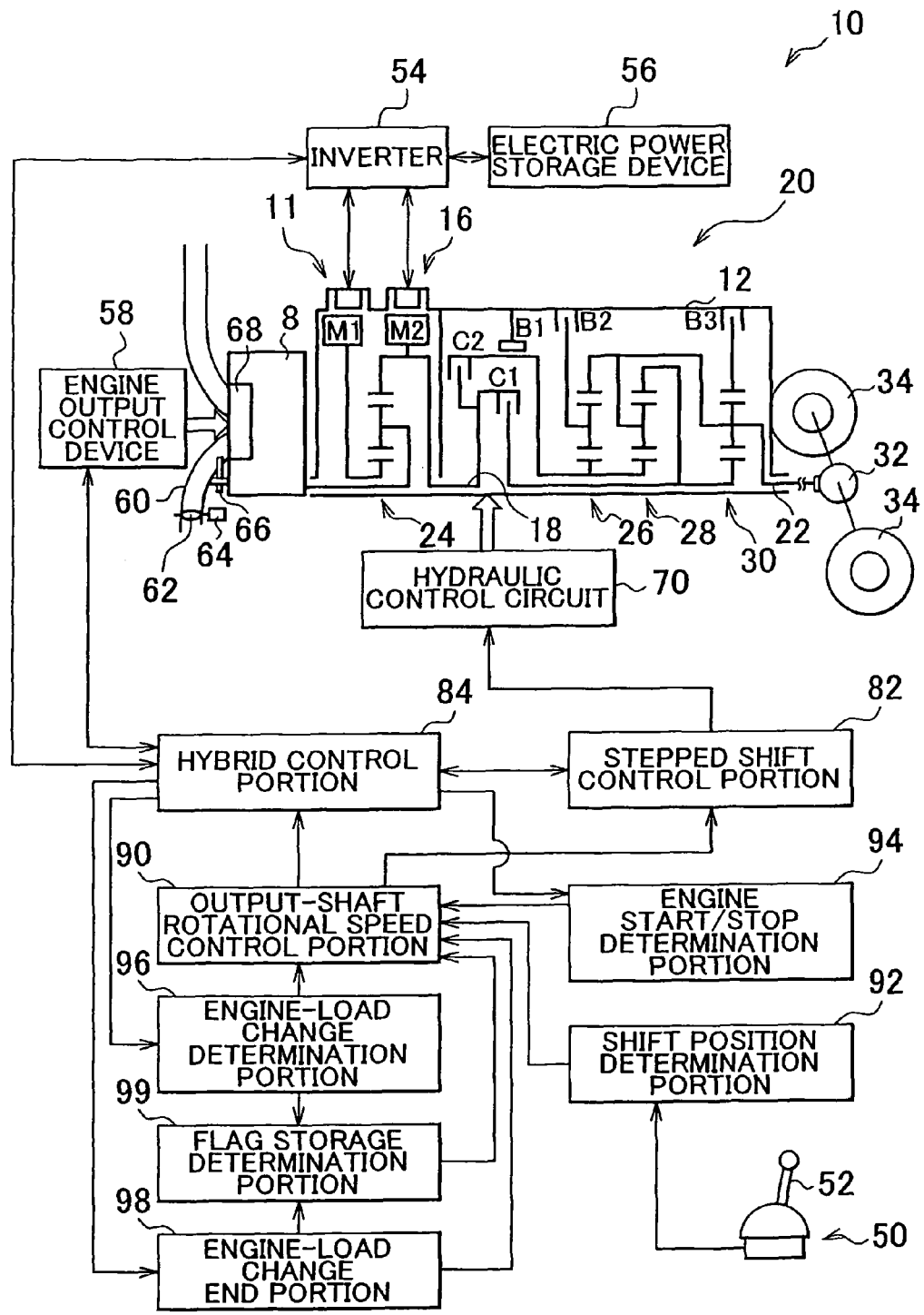
FIG. 7 is a function block diagram explaining the main control functions of the electronic control unit in FIG. 4.
Figure 8:
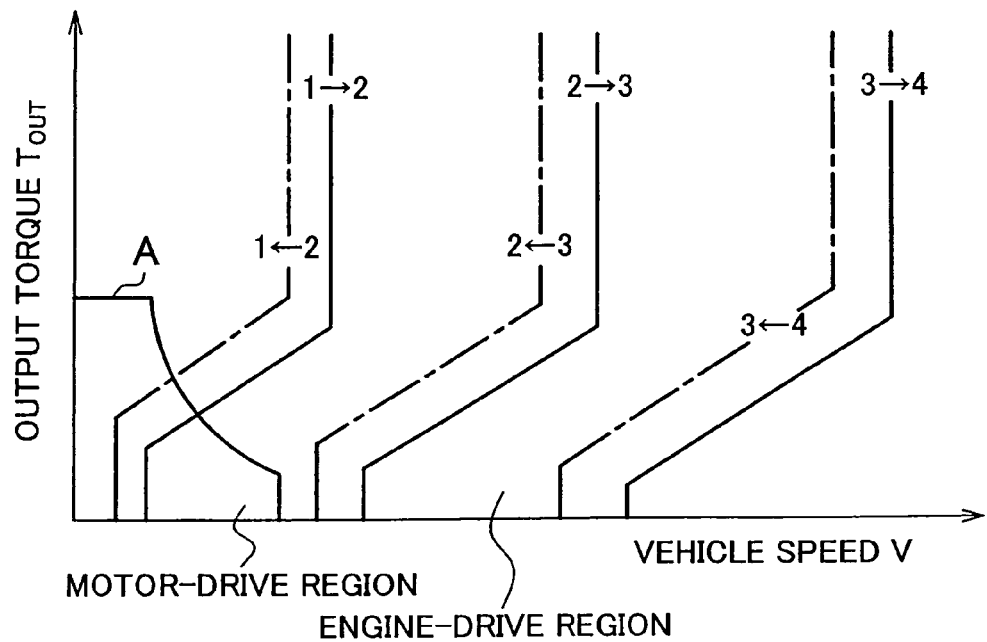
FIG. 8 shows an example of a shift map used in a shift control for a power transmission apparatus, and an example of a drive power source switching map used in a drive power source switching control that switches a drive mode between an engine-drive mode and a motor-drive mode, and FIG. 8 also shows the relation between the shift map and the drive power source switching map.

FIG. 7 is a function block diagram explaining the main part of the control operation performed by the electronic control unit 80. In FIG. 7, a stepped shift control portion 82 determines whether the automatic shift portion 20 should shift, based on the vehicle condition indicated by the actual vehicle speed V and required torque $T_{OUT}$ output from the automatic shift portion 20, using a relational diagram (i.e., a shift diagram, or a shift map) in which the vehicle speed V and the output torque $T_{OUT}$ are used as parameters, and upshift lines (solid lines) and downshift lines (chain lines) are provided, as shown in FIG. 8. That is, the stepped shift control portion 82 determines the gear to which the automatic shift portion 20 should shift, based on the vehicle condition, using the shift diagram. Then, the stepped shift control portion 82 executes the automatic shift control so that the automatic shift portion 20 shifts to the determined gear.

At this time, the stepped shift control portion 82 provides the instruction (i.e., an instruction for start of a shift, or a hydraulic pressure instruction) to the hydraulic control circuit 70 to engage and/or disengage the hydraulic frictional engagement devices relating to the shift of the automatic shift portion 20 so that the automatic shift portion 20 shifts to the determined gear according to, for example, the engagement operation table shown in FIG. 2. That is, the stepped shift control portion 82 outputs the instruction to the hydraulic control circuit 70 to disengage the disengagement-side engagement device relating to the shift of the automatic shift portion 20, and to engage the engagement-side engagement device relating to the shift of the automatic shift portion 20, thereby performing the clutch-to-clutch shift. According to the instruction, for example, the hydraulic control circuit 70 operates the hydraulic actuators for the hydraulic frictional engagement devices relating to the shift by operating the linear solenoid valves SL in the hydraulic control circuit 70. Thus, the disengagement-side engagement device relating to the shift is disengaged, and the engagement-side engagement device relating to the shift is engaged so that the automatic shift portion 20 shifts to the determined gear.

A hybrid control portion 84 operates the engine 8 efficiently, and controls the speed ratio γ0 of the differential portion 11 that functions as the electric CVT, by optimizing the ratio between the drive power provided by the engine 8 and the drive power provided by the second motor M2, and optimizing the reaction force borne by the first motor M1 while the first motor M1 generates electric power. For example, the hybrid control portion 84 calculates a target (required) output for driving the vehicle based on the accelerator-pedal operation amount Acc, which indicates the amount of output required by the driver, and the current vehicle speed V; calculates a total target output based on the target output for driving the vehicle and a required output for charging the electric power storage device 56; calculates a target engine output so that the total target output can be obtained, taking into account a transfer loss, loads of auxiliary machines, assist torque provided by the second motor M2, and the like; and controls the engine speed $N_E$ and the engine torque $T_E$ of the engine 8 to obtain the engine output that matches the target engine output, and controls the amount of electric power generated by the first motor M1.

Figure 9:
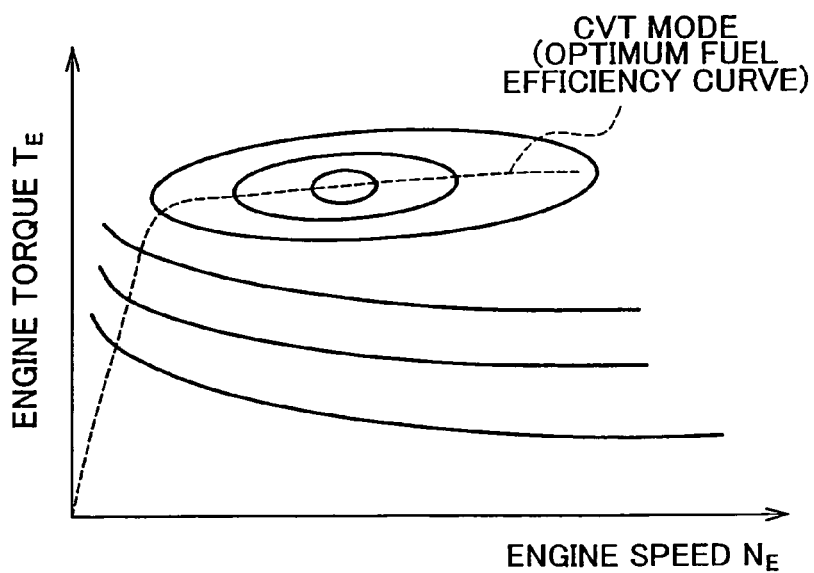
FIG. 9 shows an example of a fuel efficiency map in which a dash line is an optimum fuel efficiency curve.

For example, the hybrid control portion 84 executes the hybrid control to improve the power performance, the fuel efficiency, and the like, taking into account the gear of the automatic shift portion 20. During this hybrid control, the differential portion 11 functions as the electric CVT to coordinate the engine speed $N_E$ that is set to operate the engine 8 efficiently, and the rotational speed of the transmitting member 18, which is set by the vehicle speed V and the gear of the automatic shift portion 20. That is, the hybrid control portion 84 sets the target value of the total speed ratio γT of the shift mechanism 10 so that the engine 8 operates according to an optimum fuel efficiency curve (i.e., a fuel efficiency map, a relational diagram) as indicated by the dash line in FIG. 9. The optimum fuel efficiency curve is empirically obtained in advance in a two-dimension coordinate constituted by the engine speed $N_E$ and the torque $T_E$ output from the engine 8 (i.e., engine torque $T_E$) so that high driveability and high fuel efficiency are achieved when the vehicle is driven in the CVT mode. The optimum fuel efficiency curve is stored. For example, the hybrid control portion 84 sets the target value of the total speed ratio γT of the shift mechanism 10 to control the engine torque $T_E$ and the engine speed $N_E$ to obtain the engine output required to obtain the target output (i.e., the total target output, or the required drive power). Then, to achieve the target value, the hybrid control portion 84 controls the speed ratio γ0 of the differential portion 11, taking into account the gear of the automatic shift portion 20, thereby controlling the total speed ratio γT in a range in which the total speed ratio γT can be changed.

At this time, the hybrid control portion 84 supplies the electric energy generated by the first motor M1 to the electric power storage device 56 and the second motor M2 through an inverter 54. Therefore, although a large part of the power output from the engine 8 is mechanically transmitted to the transmitting member 18, part of the power output from the engine 8 is consumed by the first motor M1 to generate electric power. That is, part of the power output from the engine 8 is converted to electric energy in the first motor M1. The electric energy is supplied to the second motor M2 through the inverter 54, and the second motor M2 is driven. Thus, mechanical energy is transmitted from the second motor M2 to the transmitting member 18. The devices related to the process from the generation of the electric power to the consumption of the electric power in the second motor M2 constitute an electric path in which part of the power output from the engine 8 is converted to the electric energy, and the electric energy is converted to the mechanical energy.

The hybrid control portion 84 can maintain the engine speed $N_E$ at a substantially constant value, or control the engine speed $N_E$ to any given value by using the electric CVT function of the differential portion 11 to control the first-motor rotational speed $N_{M1}$ and/or the second-motor rotational speed $N_{M2}$, regardless of whether the vehicle is stopped or is traveling. In other words, the hybrid control portion 84 can control the first-motor rotational speed $N_{M1}$ and/or the second-motor rotational speed $N_{M2}$ to any given value(s), while maintaining the engine speed $N_E$ at a substantially constant value, or controlling the engine speed $N_E$ to any given value.

For example, as shown in the collinear diagram in FIG. 3, when the engine speed $N_E$ needs to be increased while the vehicle is driven, the hybrid control portion 84 increases the first-motor rotational speed $N_{M1}$ while maintaining the second-motor rotational speed $N_{M2}$, which depends on the vehicle speed V (the rotational speed of drive, wheels 34), to a substantially constant value. When the engine speed $N_E$ needs to be maintained at a substantially constant value during the shift of the automatic shift portion 20, the hybrid control portion 84 increases the first-motor rotational speed $N_{M1}$ if the second-motor rotational speed $N_{M2}$ is decreased by the shift of the automatic shift portion 20, and decreases the first-motor rotational speed $N_{M1}$ if the second-motor rotational speed $N_{M2}$ is increased by the shift of the automatic shift portion 20, while maintaining the engine speed $N_E$ at a substantially constant value.

Also, the hybrid control portion 84 has a function of executing an output control on the engine 8 so that the engine 8 generates the required output, by outputting at least one of the instruction for controlling opening/closing of the electronic throttle valve 62 using the throttle actuator 64, the instruction for controlling the amount of fuel injected by the fuel injection device 66, and the timing at which fuel is injected by the fuel injection device 66, and the instruction for controlling the timing at which the fuel is ignited by the ignition device 68 such as the igniter, to the engine output control device 58.

For example, the hybrid control portion 84 basically executes a throttle control to drive the throttle actuator 60 based on the accelerator-pedal operation amount Acc according to a prestored relation (not shown). That is, the hybrid control portion 84 basically executes the throttle control to increase the throttle-valve opening amount $θ_{TH}$ as the accelerator-pedal operation amount Acc increases. The engine output control device 58 controls the engine torque, for example, by controlling the opening/closing of the electronic throttle valve 62 using the throttle actuator 64, controlling the fuel injection performed by the fuel injection device 66, and controlling the timing at which the fuel is ignited by the ignition device 68 such as the igniter, according to the instruction provided by the hybrid control portion 84.

Also, the hybrid control portion 84 can drive the vehicle in a motor-drive mode, using the electric CVT function (differential operation) of the differential portion 11, regardless of whether the engine 8 is stopped or idling. For example, the hybrid control portion 84 drives the vehicle in the motor-drive mode in a low output torque $T_{OUT}$ region, that is, in a low engine torque $T_E$ region where the engine efficiency is generally lower than that in a high torque region, or in a low vehicle speed region where the vehicle speed V is low, that is, a low load region. When the vehicle is driven in the motor-drive mode, the hybrid control portion 84 executes the control to suppress the drag of the engine 8 that is stopped, and to improve fuel efficiency. That is, when the vehicle is driven in the motor-drive mode, the hybrid control portion 84 controls the first motor M1 so that the first-motor rotational speed $N_{M1}$ is a negative value, for example, the hybrid control portion 84 places the first motor M1 in a no-load state so that the first motor M1 is idling, thereby maintaining the engine speed $N_E$ at zero or substantially zero using the electric CVT function (differential operation) of the differential portion 11, as required.

Even when the vehicle is driven in the engine-drive mode, the hybrid control portion 84 can perform a so-called torque-assist operation to assist the engine 8, by supplying the electric energy to the second motor M2 from the first motor M1 via the electric path, and/or from the electric power storage device 56, and by driving the second motor M2 to apply torque to the drive wheels 34.

Also, the hybrid control portion 84 can place the first motor M1 in a no-load state to permit the first motor M1 to idle. In this case, torque cannot be transmitted in the differential portion 11, that is, the transmission of power is substantially interrupted in the power transmission path in the differential portion 11, and no output is generated from the differential portion 11. That is, the hybrid control portion 84 can place the differential portion 11 in the neutral state so that the transmission of power is electrically interrupted in the power transmission path in the differential portion 11, by placing the first motor M1 in the no-load state.

The hybrid control portion 84 functions as a regenerative control portion. That is, when the accelerator pedal is released, and the vehicle is coasting, or when the foot brake is applied, in order to improve fuel efficiency, the hybrid control portion 84 causes the second motor 2 to rotate and to function as the power generator, using the kinetic energy of the vehicle, that is, reverse drive power transmitted from the drive wheels 34 to the engine 8 so that the electric power storage device 56 is charged with the electric energy, that is, the electric current generated by the second motor M2 through the inverter 54. In the regenerative control, a regeneration amount is controlled to a value that is set based on, for example, the state of charge SOC of the electric power storage device 56, and the proportion of a braking force to be generated by a hydraulic brake, which is set to obtain a braking force corresponding to the operation amount of a brake pedal.

An output-shaft rotational speed control portion 90 controls the rotational speed of the output shaft of the differential portion 11 to a predetermined rotational speed, according to the state of the vehicle, if the shift position SP of the shift operation device 50 is changed from the parking position to the neutral position. Hereinafter, the control of the output shaft of the differential portion 11 according to each state of the vehicle will be described.

Figure 10:
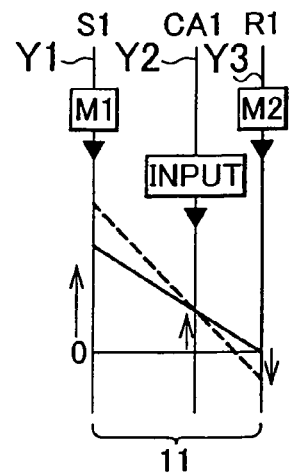
FIG. 10 is a collinear diagram showing relative rotational speeds of rotational elements in a differential portion in FIG. 3, and particularly showing rotational states of the rotational elements when the rotational speed of an engine is increased to an ignition rotational speed at which ignition can be performed, to start the engine.

First, the case where the shift position SP is changed from the parking position to the neutral position while the engine 8 is being started will be described. FIG. 10 is a collinear diagram showing the relative rotational speeds of the rotational elements of the differential portion 11 in FIG. 3. FIG. 10 shows the states of the rotational elements when the rotational speed $N_E$ of the engine 8 is increased to an ignition rotational speed at which ignition can be performed, to start the engine 8. As shown by the solid line in FIG. 10, when the engine 8 is started, the rotational speed of the first carrier CA1, that is, the engine speed $N_E$ is quickly increased to the ignition rotational speed, by increasing the rotational speed of the first sun gear S1 using the first motor M1. At this time, the engine speed $N_E$ is quickly increased by executing a lock control that fixes the rotational speed of the first ring gear R1 to zero or substantially zero using the second motor 2.

In the related art, if the shift position SP is changed to the neutral position N, the lock control that locks the second motor M2 ends, and therefore, the second motor M2 is rotated, as shown by the dashed line in FIG. 10. Thus, it is difficult to quickly increase the rotational speed $N_E$ of the engine 8. Accordingly, even if the shift position SP is changed from the parking position to the neutral position, the output-shaft rotational speed control portion 90 continues to control the rotational speed of the output shaft of the differential portion 11, that is, the transmitting member 18 (the first ring gear R1), until the engine 8 is started. More specifically, the output-shaft rotational speed control portion 90 continues to execute the lock control that fixes the rotational speed $N_{18}$ of the transmitting member 18 to zero or substantially zero until the control that starts the engine 8 ends.

The rotational speed of the output shaft of the differential portion 11, that is, the rotational speed $N_{18}$ of the transmitting member 18 is controlled by controlling the rotational speed of the second motor M2 connected to the transmitting member 18. Alternatively, the rotational speed $N_{18}$ of the transmitting member 18 is controlled to zero or substantially zero by placing the power transmission path between the differential portion 11 and the drive wheels 34 in the power-transmission permitted state, that is, by allowing power to be transmitted in the power transmission path between the differential portion 11 and the drive wheels 34, and thus using inertia torque (restraint torque) transmitting from the drive wheels 34. More specifically, power is allowed to be transmitted between the output shaft of the differential portion 11 (i.e., the transmitting member 18) and the drive wheels 34, by achieving a predetermined gear in the automatic shift portion 20. At this time, the rotational speed $N_{18}$ of the transmitting member 18 is fixed to zero or substantially zero, because the vehicle speed V is zero or substantially zero immediately after the shift position SP is changed from the parking position to the neutral position.

Further, the rotational speed of the transmitting member 18 may be fixed to zero or substantially zero, by locking rotational elements in the automatic shift portion 20, i.e., by locking the inner portion of the automatic shift portion 20 by engaging predetermined engagement elements in the automatic shift portion 20. More specifically, the rotational speed $N_{18}$ of the transmitting member 18 (the first ring gear R1) may be fixed to zero, for example, by engaging the first brake B1 and the second clutch C2, or by engaging the first clutch C1, the first brake B1, second brake B2, and the third brake B3 so that the inner portion of the automatic shift portion 20 is locked.

Referring to FIG. 7 again, a shift position determination portion 92 determines whether the shift position SP, which is the operational position of the shift operation device 50, is the position "P" or the position "N". The current shift position SP is determined based on a signal output from a shift position sensor provided in the shift operation device 50. An engine start/stop determination portion 94 determines whether a control that starts the engine 8 or a control that stops the engine 8 is being executed.

Figure 11:
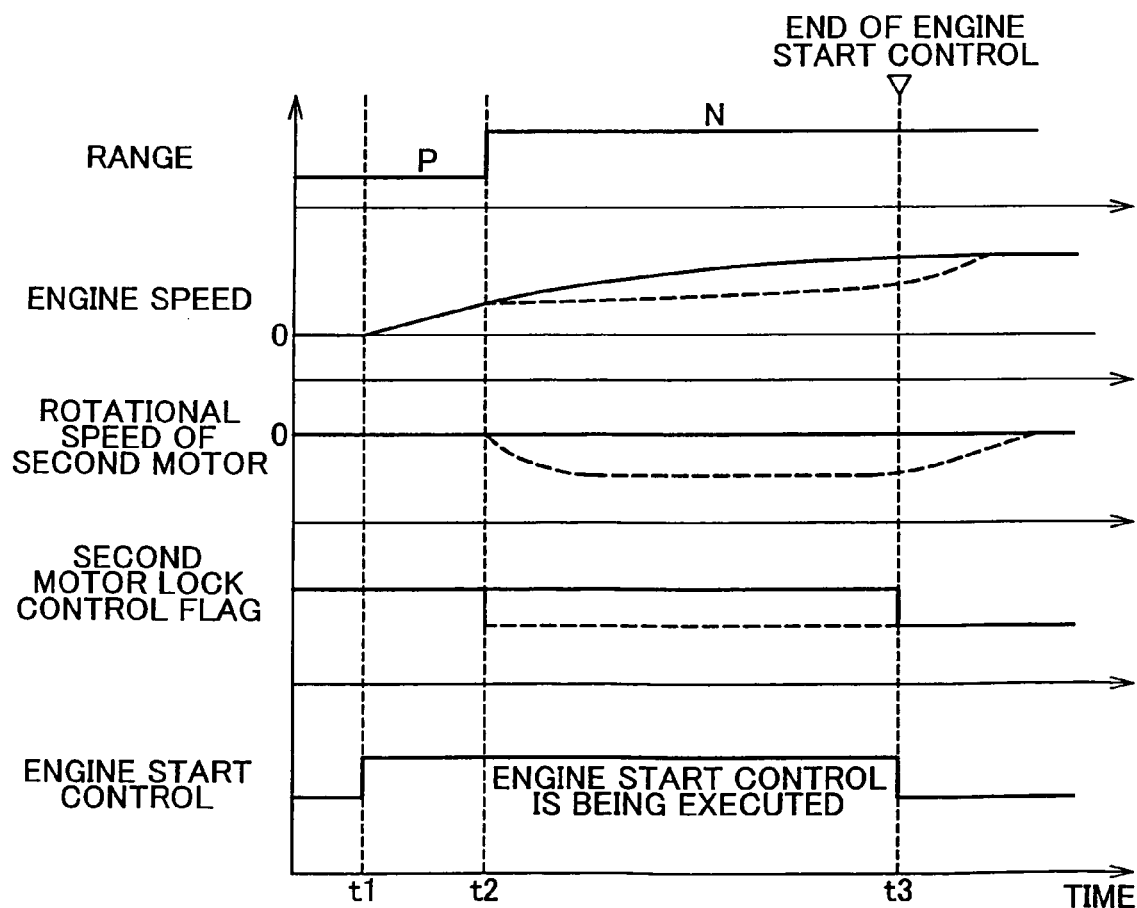
FIG. 11 is a time chart explaining an operation control according to the invention, which is executed if the shift position is changed from a parking position to a neutral position at an engine start time.

FIG. 11 is a time chart explaining the operation control executed if the shift position SP is changed from the parking position to the neutral position at an engine start time. At time point t1, the control that starts the engine 8 is started, and accordingly, the engine speed $N_E$ is increased using the first motor M1. Then, at time point t2, the shift position SP is changed from the parking position to the neutral position. The output-shaft rotational speed control portion 90 outputs an instruction for continuing to execute the lock control that locks the second motor M2, to the hybrid control portion 84. Thus, even if the shift position SP is changed to the neutral position, the second motor M2 maintains the rotational speed $N_{18}$ of the transmitting member 18 at zero or substantially zero, as shown by the solid line. Thus, at time point t3, the engine speed $N_E$ is quickly increased to the ignition rotational speed. The dashed line shows the state when a control in the related art is executed. If the shift position SP is changed to the neutral position at time t2, the lock control that locks the second motor M2 is stopped, and thus, the second motor M2 is idling in a manner such that the rotational speed of the second motor M2 is a negative value. Thus, the engine speed $N_E$ is increased slowly.

Figure 12:
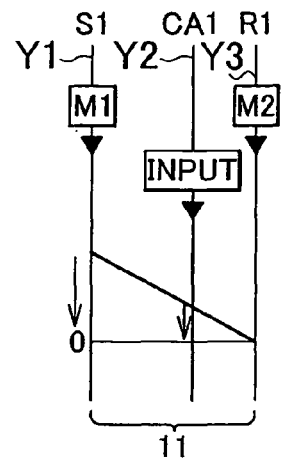
FIG. 12 is a collinear diagram showing relative rotational speeds of rotational elements in a differential portion in FIG. 3, and particularly showing rotational states of the rotational elements when the engine is quickly stopped.

Also, when the control that stops the engine 8 is executed, the output-shaft rotational speed control portion 90 continues to execute the control that fixes the rotational speed $N_{18}$ of the transmitting member 18 at zero or substantially zero until the control that stops the engine 8 ends, as well as when the engine 8 is started. FIG. 12 is a collinear diagram showing relative rotational speeds of the rotational elements in the differential portion 11. FIG. 12 shows the states of the rotational elements when the engine 8 is quickly stopped. As shown in FIG. 12, in the control that stops the engine 8, the rotational speed of the first carrier CA1, that is, the engine speed $N_E$ is decreased to zero, by quickly decreasing the rotational speed of the first sun gear S1 to zero using the first motor M1. At this time, the lock control is executed, that is, the rotational speed of the first ring gear R1 is controlled to zero or substantially zero, for example, using the motor M2 (or by engaging the engagement elements in the automatic shift portion 20). If the lock control that locks the second motor M2 is stopped, the second motor M2 is rotated (idling). Thus, it is difficult to decrease the engine speed $N_E$. Thus, even if the shift position SP is changed from the parking position to the neutral position, the output-shaft rotational speed control portion 90 continues to execute the lock control that locks the output shaft of the differential portion 11, that is, the transmitting member 18 until the control that stops the engine 8 ends.

Next, the case where the shift position SP is changed from the parking position to the neutral position during a change in the load of the engine 8 will be described. For example, the change in the load of the engine 8 is caused by a load operation of the engine 8 performed using the first motor M1 to charge the electric power storage device 56 (i.e., to generate electric power), or racing of the engine 8 due to the depression of the accelerator pedal by the driver. That is, the change in the load of the engine 8 is caused by an operation of the engine 8 performed in a manner such that the engine output is changed. For example, the change in the load of the engine 8 is caused by the load operation performed to charge the electric power storage device 56 in a manner such that the load of the engine 8 is changed due to, for example, a change in the charge amount, or the racing of the engine 8.

If the shift position SP is changed from the parking position to the neutral position during the change in the load of the engine 8, the engine 8 is idling, or the engine 8 is operated using the first motor M1, and the change in the load of the engine 8 ends. If the second motor M2, that is, the first ring gear R1 is rotated when the shift position SP is changed to the neutral position, the rotational speed of the engine 8 fluctuates, and thus, noise/vibration characteristics (hereinafter, referred to as NV characteristics) may deteriorate. Thus, even if the shift position SP is changed to the neutral position, the output-shaft rotational speed control portion 90 continues to execute the lock control that maintains the rotational speed of the output shaft of the differential portion 11, that is, the rotational speed $N_{18}$ of the transmitting member 18 at zero or substantially zero until the change in the load of the engine 8 ends.

Referring back to FIG. 7, an engine-load change determination portion 96 determines whether the load operation is being performed, that is, the engine 8 is being driven to generate electric power using the first motor M1, or whether the engine 8 is racing due to the depression of the accelerator pedal by the driver. Also, the engine-load change end determination portion 98 determines whether the load operation of the engine 8 ends. It is determined that the change in the load of the engine 8 ends, for example, when the rotational speed $N_E$ of the engine 8 decreases, the amount of air taken into the engine 8 decreases, or the throttle-valve opening amount $\theta_{TH}$ of the electronic throttle valve 62 decreases.

When the shift position SP is the parking position, and the load operation is performed or the engine 8 is racing, a flag storage determination portion 99 assigns 1 to a flag F so that the flag F stores 1. When the load operation ё the racing of the engine 8 ends, the flag storage determination portion 99 assigns 0 to the flag F so that the flag F stores 0. When the shift position SP is the neutral position, and the control that starts the engine 8 and the control that stops the engine 8 are not executed, the flag storage determination portion 99 determines whether the value of the flag F is 1. That is, the flag storage determination portion 99 determines whether the shift position SP is changed from the parking position to the neutral position while the load operation of the engine 8 is being performed or the engine 8 is racing.

Figure 13:
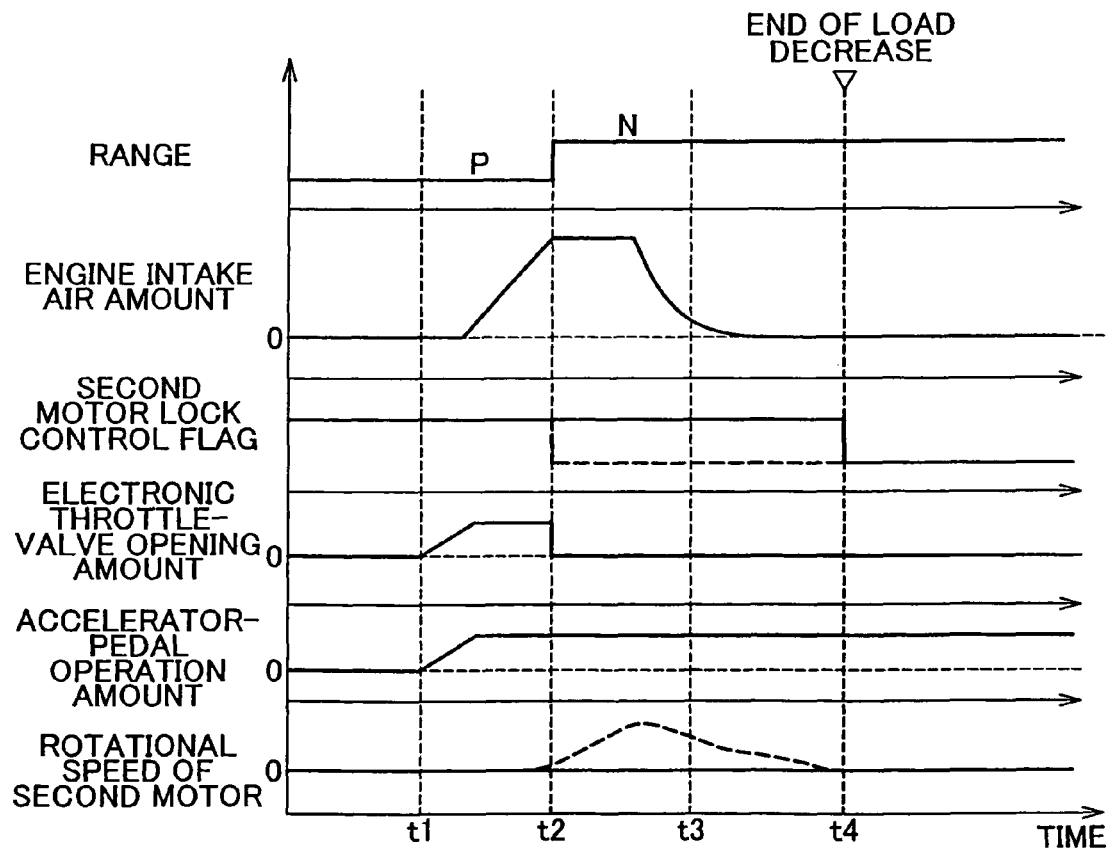
FIG. 13 is a time chart explaining an operation control according to the invention, which is executed if the shift position is changed from the parking position to the neutral position while the engine is racing.

FIG. 13 is a time chart explaining the operation control executed if the shift position SP is changed from the parking position to the neutral position while the engine 8 is racing. When the racing of the engine 8 is started due to the depression of the accelerator pedal at time point t1, the accelerator-pedal operation amount Acc and the throttle-valve opening amount $\theta_{TH}$ are increased, and the amount of air taken into the engine 8 is increased. When the shift position SP is changed to the neutral position at time point t2, the control that ends the racing of the engine 8 (the control that ends the change in the load) is started. The flag storage determination portion 99 determines that the shift position SP is changed to the neutral position at time point t2. At time point t2, the electronic throttle valve 62 is closed, regardless of the accelerator-pedal operation amount Acc. Accordingly, the amount of air taken into the engine 8 is decreased. Although the shift position SP is changed to the neutral position, the output-shaft rotational speed control portion 90 continues to execute the lock control that locks the first ring gear R1 using the second motor M2 until the racing of the engine 8 ends. This suppresses the fluctuation of the rotational speed of the engine 8 due to idling of the second motor M2.

The dashed line shows the state when a control in the related art is executed. When the shift position SP is changed to the neutral position at time point t2, the lock control that locks the second motor M2 is stopped, and the second motor M2 is rotated (idling). Thus, the rotational speed of the engine 8 fluctuates, and the NV characteristics deteriorate.

Figure 14:
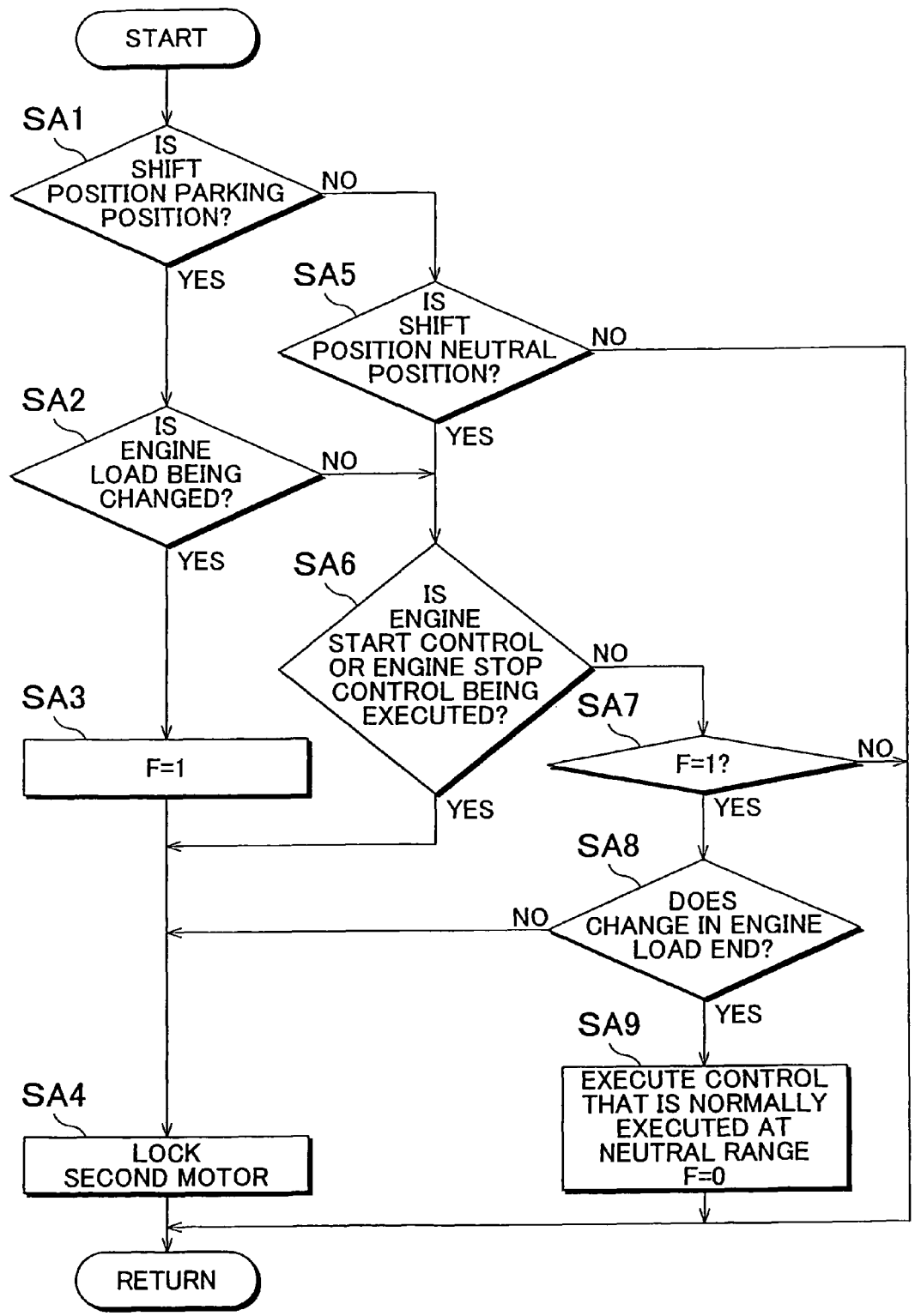
FIG. 14 is a time chart explaining a main part of a control operation executed by the electronic control unit according to the invention, that is, an operation control that quickly starts or stops the engine, or suppresses deterioration of noise/vibration characteristics (N/V characteristics) by suppressing fluctuation of the rotational speed of the engine, if the shift position is changed from the parking position to the neutral position while the control that starts or stops the engine is being executed, or a load of the engine is being changed.

FIG. 14 is a time chart explaining a main part of the control operation executed by the electronic control unit 80, that is, the operation control that quickly starts or stops the engine 8, or suppresses deterioration of the noise/vibration characteristics (the NV characteristics) by suppressing the fluctuation of the rotational speed of the engine 8, if the shift position SP is changed from the parking position to the neutral position while the control that starts or stops the engine 8 is being executed, or the load is being changed. The operation control is repeatedly executed in an extremely short cycle time of, for example, approximately several msec to several tens of msec.

First, in step SA1 corresponding to the shift position determination portion 92, it is determined whether the shift position SP is the parking position. When an affirmative determination is made in step SA1 it is determined whether the load operation or the racing operation of the engine 8 is being performed in step SA2 corresponding to the engine-load change determination portion 96. When an affirmative determination is made in step SA2, the value of the flag F is set to 1 in step SA3 corresponding to the flag storage determination portion 99, and the lock control that locks the transmitting member 18 (the first ring gear R1) using the second motor M2 is executed in step SA4 corresponding to the output-shaft rotational speed control portion 90.

When a negative determination is made in step SA1, it is determined whether the shift position SP is the neutral position in step SA5 corresponding to the shift position determination portion 92. When a negative determination is made in step SA5, the routine ends. When an affirmative determination is made in step SA5, or a negative determination is made in step SA2, it is determined whether the control that starts or stops the engine 8 is being executed in step SA6 corresponding to the engine start/stop determination portion 94. When an affirmative determination is made in step SA6, the lock control using the second motor M2 continues to be executed until the control that starts or stops the engine 8 ends, in step SA4.

When a negative determination is made in step SA6, it is determined whether the value of the flag F is 1 in step SA7 corresponding to the flag storage determination portion 99. When a negative determination is made in step SA7, the routine ends. When an affirmative determination is made in step SA7, it is determined that the shift position SP is changed from the parking position to the neutral position while the load operation of the engine 8 is being performed, or the engine 8 is racing. Thus, it is determined whether the change in the load of the engine 8 ends, that is, whether the load operation or the racing of the engine 8 ends in step SA8 corresponding to the engine-load change end determination portion 98. When a negative determination is made in step SA8, the lock control using the second motor M2 continues to be executed until the control that changes the load of the engine 8 ends, in step SA4. When an affirmative determination is made in step SA8, the value of the flag F is set to zero in step SA9 corresponding to the flag storage determination portion 99. Thus, a control, which is normally executed at a neutral range, is executed.

As described above, according to the embodiment, if the shift position SP is changed from the parking position to the neutral position while one of the control that starts the engine 8 and the control that stops the engine 8 is being executed, the output-shaft rotational speed control portion 90 controls the rotational speed of the output shaft of the differential portion 11 (i.e., the transmitting member 18) to the predetermined rotational speed until the at least one of the control that starts the engine 8 and the control that stops the engine 8 ends. Therefore, even if the shift position SP is changed to the neutral position, the rotational speed of the output shaft of the differential portion 11 (i.e., the transmitting member 18) continues to be controlled, and thus, the engine 8 is quickly started and/or stopped. Thus, it is possible to suppress a decrease in the starting performance and/or the stopping performance of the engine 8.

Also, according to the embodiment, if the shift position SP is changed from the parking position to the neutral position during the change in the load of the engine 8, the output-shaft rotational speed control portion 90 controls the rotational speed of the output shaft of the differential portion 11 (i.e., the transmitting member 18) to the predetermined rotational speed until the change in the load of the engine 8 ends. Therefore, if the shift position SP is changed from the parking position to the neutral position, the rotational speed of the output shaft of the differential portion 11 (i.e., the transmitting member 18) continues to be controlled, and the fluctuation of the rotational speed of the engine 8 is suppressed when the change in the load is to be ended. Thus, it is possible to suppress the deterioration of the noise/vibration characteristics (the NV characteristics).

Also, according to the embodiment, the second motor M2 is connected to the output shaft of the differential portion 11 (i.e., the transmitting member 18). The output-shaft rotational speed control portion 90 controls the rotational speed of the transmitting member 18 to the predetermined rotational speed using the second motor M2. Therefore, it is possible to quickly control the rotational speed of the transmitting member 18 to the predetermined rotational speed.

Also, according to the embodiment, the predetermined rotational speed is zero or substantially zero. Therefore, the rotational speed of the transmitting member 18 is controlled to the predetermined rotational speed by stopping or substantially stopping the rotation of the second motor M2.

Also, according to the embodiment, the output-shaft rotational speed control portion 90 controls the rotational speed of the output shaft of the differential portion 11 (i.e., the transmitting member 18) to the predetermined rotational speed, by engaging the engagement elements in the automatic shift portion 20 to allow power to be transmitted between the output shaft of the differential portion 11 (i.e., the transmitting member 18) and the drive wheels 34. Therefore, it is possible to mechanically control the rotational speed of the output shaft of the differential portion 11 (i.e., the transmitting member 18) using the inertia torque (stop torque) transmitted from the drive wheels 34, without using the second motor M2.

Also, according to the embodiment, the automatic shift portion 20 is provided between the differential portion 11 and the drive wheels 34, and the engagement elements are constituent elements of the automatic shift portion 20. Therefore, it is possible to allow power to be transmitted between the output shaft of the differential portion 11 (i.e., the transmitting member 18) and the drive wheels 34, by achieving a predetermined gear by engaging the engagement elements.

Also, according to the embodiment, the automatic shift portion 20 includes a plurality of engagement elements. The rotational speed of the output shaft of the differential portion 11 (i.e., the transmitting member 18) is made zero or substantially zero, by locking the inner portion of the automatic shift portion 20 by engaging the plurality of the engagement elements. Therefore, it is possible to easily fix the rotational speed of the output shaft of the differential portion 11 (i.e., the transmitting member 18) at zero or substantially zero, by engaging the plurality of the engagement elements.

Also, according to the embodiment, when the shift position SP is the neutral position, the engine 8 is idling, or the engine 8 is operated using the first motor M1. Therefore, for example, if the shift position SP is changed from the parking position to the neutral position during the change in the load of the engine 8, the change in the load of the engine 8 ends.

Also, according to the embodiment, the change in the load of the engine 8 is caused by the load operation of the engine 8 performed to charge the electric power storage device. Therefore, even if the shift position SP is changed to the neutral position while the electric power storage device 56 is charged with electric power due to the load operation of the engine 8, the rotational speed of the output shaft of the differential portion 11 (i.e., the transmitting member 18) is controlled, and thus, the fluctuation of the rotational speed of the engine 8 is suppressed. Thus, it is possible to suppress the deterioration of the NV characteristics.

Also, according to the embodiment, the change in the load of the engine 8 is caused by racing of the engine 8 due to the depression of the accelerator pedal by the driver. Therefore, even if the shift position SP is changed from the parking position to the neutral position while the engine 8 is racing, the rotational speed of the output shaft of the differential portion 11 (i.e., the transmitting member 18) is controlled, and thus, the fluctuation of the rotational speed of the engine 8 is suppressed. Thus, it is possible to suppress the deterioration of the NV characteristics.

Although the invention has been described in detail with reference to the drawings, the invention may be realized in other embodiments.

For example, the output shaft of the differential portion 11 (i.e., the transmitting member 18) in the above-described embodiment may be locked by executing i) the lock control using the second motor M2, ii) the lock control that connects the power transmission paths by engaging the engagement elements in the automatic shift portion 20, and iii) the lock control that locks the inner portion of the automatic shift portion 20 by engaging the engagement elements in the automatic shift portion 20, according to the state of the vehicle. For example, when the state of charge SOC is low, priority may be given to the lock control in which the engagement elements in the automatic shift portion 20 are engaged. When the engine 8 is stopped, priority may be given to the lock control using the second motor M2.

In the above-described embodiment, the differential portion 11 functions as the electric CVT in which the speed ratio γ0 is continuously changed from the minimum value γ0min to the maximum value γ0max. However, for example, the invention may be applied to a vehicular drive apparatus that includes the differential portion 11 in which the speed ratio γ0 is changed in a stepwise manner using the differential operation, instead of continuously changing the speed ratio γ0.

In the above-described embodiment, the differential portion 11 may include a limited slip differential that is provided in the power split mechanism 16, and that limits the differential operation of the differential portion 11 so that the differential portion 11 is operated as a stepped transmission with at least two forward gears.

Also, in the power split mechanism 16 in the above-described embodiment, the first carrier CA1 is connected to the engine 8, the first sun gear S1 is connected to the first motor M1, and the first ring gear R1 is connected to the transmitting member 18. However, the connection relation is not necessarily limited to this relation. Each of the engine 8, the first motor M1, and the transmitting member 18 may be connected to any of the three elements CA1, S1, and R1 of the first planetary gear unit 24.

In the above-described embodiment, the engine 8 is directly connected to the input shaft 14. However, for example, the engine 8 may be operatively connected to the input shaft 14 via a gear, a belt, or the like. The engine 8 and the input shaft 14 do not necessarily need to be provided on a common axis.

In the above-described embodiment, the first motor M1 and the second motor M2 are disposed coaxially with the input shaft 14, the first motor M1 is connected to the first sun gear S1, and the second motor M2 is connected to the transmitting member 18. However, the first motor M1 and the second motor M2 do not necessarily need to be disposed in this manner. For example, the first motor M1 may be operatively connected to the first sun gear S1 via a gear, a belt, a reducer, or the like, and the second motor M2 may be operatively connected to the transmitting member 18 via a gear, a belt, a reducer, or the like.

In the above-described embodiment, each of the hydraulic frictional engagement devices, such as the first clutch C1 and the second clutch C2, may be a magnetic-particle engagement device such as a magnetic powder clutch (magnetic-particle clutch), an electromagnetic engagement device such as an electromagnetic clutch, or a mechanical engagement device such as a mesh dog clutch. For example, when the electromagnetic clutch is employed, the hydraulic control circuit 70 is not configured using the valve device that switches the oil passage. Instead, the hydraulic control circuit 70 may be configured using a switching device, an electromagnetic switching device, or the like, which switches the state of an electric instruction signal circuit that provides an electric instruction signal to the electromagnetic clutch.

In the above-described embodiment, the automatic shift portion 20 is connected to the differential portion 11 in series via the transmitting member 18. However, a counter shaft may be provided in parallel with the input shaft 14, and the automatic shift portion 20 may be coaxially provided on the counter shaft. In this case, the differential portion 11 is connected to the automatic shift portion 20 so that power is transmitted, via a transmitting member set which includes a counter gear pair, a sprocket, and a chain, and which functions as the transmitting member 18.

In the above-described embodiment, the power split mechanism 16, which functions as the differential mechanism, may be a differential gear unit that includes a pinion that is rotated by the engine, and a pair of bevel gears that meshes with the pinion. In this case, the differential gear unit is operatively connected to the first motor M1 and the transmitting member 18 (the second motor M2).

In the above-described embodiment the power split mechanism 16 includes one planetary gear unit. However, the power split mechanism 16 may include at least two planetary gear units. When the power split mechanism 16 is in the non-differential mode (the speed-ratio fixed mode), the power split mechanism 16 may function as a transmission with at least three gears. Each of the at least two planetary gear units is not limited to the single pinion planetary gear unit, and may be a double pinion planetary gear unit. When the power split mechanism 16 includes at least two planetary gear units, the engine 8, the first and second motors M1 and M2, and the transmitting member 18 may be connected to the rotational elements of the planetary gear units so that power is transmitted, and the mode of the power transmitting mechanism 16 may be changed between a stepped shift transmission mode and the CVT mode by controlling the clutches C and the brakes B that are connected to the rotational elements of the planetary gear units.

In the above-described embodiment, the engine 8 is directly connected to the differential portion 11. However, the engine 8 need not necessarily be directly connected to the differential portion 11, and a clutch may be provided between the engine 8 and the differential portion 11.

Also, in the above-described embodiment, the differential portion 11 is connected to the automatic shift portion 20 in series. However, the invention is not limited to this configuration. The invention may be applied to any configuration as long as the entire shift mechanism 10 has the function of performing the electric differential operation, and the function of performing a gear shift based on a principle that is different from the principle based on which the speed ratio is changed using the electric differential operation. The functions need not necessarily be mechanically independent of each other. Also, the positions at which the functions are arranged are not limited to specific positions, and the order in which the functions are arranged is not limited to a specific order. That is, the functions may be freely arranged. Also, the invention may be applied to any shift mechanism as long as the shift mechanism has the function of performing the electric differential operation, and the function of performing a gear shift, even if part of, or all of the configuration of each function is the same as that of the shift mechanism 10.

Also, in the above-described embodiment, the stepped transmission with four gears, in which the first to fourth gears can be achieved, is employed as the automatic shift portion 20. However, the number of gears that can be achieved in the automatic shift portion 20 is not limited to four. The number of gears that can be achieved in the automatic shift portion 20 may be freely changed. For example, the number of gears that can be achieved in the automatic shift portion 20 may be changed to five. Also, the connection relation among the elements in the automatic shift portion 20 is not limited to the connection relation in the embodiment, and may be freely changed.

The above-described embodiment is an example embodiment. Various modifications and improvements may be made to the invention based on knowledge of persons skilled in the art.

What is claimed is:

1. A control apparatus for a power transmission apparatus for a vehicle, which includes an electric differential portion in which a difference between a rotational speed of an input shaft connected to a main power source and a rotational speed of an output shaft is controlled by controlling an operating state of a motor connected to a rotational element of a differential mechanism, the control apparatus comprising
   an output-shaft rotational speed control portion that controls the rotational speed of the output shaft of the electric differential portion to a predetermined rotational speed until at least one of a control that starts the main power source and a control that stops the main power source ends, if at least one of a shift position and a shift range is changed from a parking position to a neutral position while the at least one of the control that starts the main power source and the control that stops the main power source is being executed.

2. The control apparatus according to claim 1, wherein:
   the power transmission apparatus further includes an output-shaft connected motor that is connected to the output shaft of the electric differential portion; and
   the output-shaft rotational speed control portion controls the rotational speed of the output shaft to the predetermined rotational speed using the output-shaft connected motor.

3. The control apparatus according to claim 1, wherein the predetermined rotational speed is zero or substantially zero.

4. The control apparatus according to claim 1, wherein:
   the power transmission apparatus further includes an engagement element that constitutes a part of a power transmission path between the electric differential portion and a drive wheel; and
   the output-rotational speed control portion controls the rotational speed of the output shaft of the electric differential portion to the predetermined rotational speed, by engaging the engagement element to allow power to be transmitted between the output shaft of the electric differential portion and the drive wheel.

5. The control apparatus according to claim 4, wherein:
   the power transmission apparatus further includes a shift portion provided in the power transmission path between the electric differential portion and the drive wheel; and
   the engagement element is a constituent element of the shift portion.

6. The control apparatus according to claim 1, wherein:
   the power transmission apparatus further includes a shift portion that is provided in a power transmission path between the electric differential portion and a drive wheel, and that includes a plurality of engagement elements; and
   the output-shaft rotational speed control portion controls the rotational speed of the output shaft of the electric differential portion to zero or substantially zero, by locking an inner portion of the shift portion by engaging the engagement elements.

7. The control apparatus according to claim 1, wherein when the shift position or the shift range is the neutral position, the main power source is only idling, or the main power source is only operated using the motor.

8. A control apparatus for a power transmission apparatus for a vehicle, which includes an electric differential portion in which a difference between a rotational speed of an input shaft connected to a main power source and a rotational speed of an output shaft is controlled by controlling an operating state of a motor connected to a rotational element of a differential mechanism, the control apparatus comprising
   an output-shaft rotational speed control portion that controls the rotational speed of the output shaft of the electric differential portion to a predetermined rotational speed until a change in a load of the main power source ends, if at least one of a shift position and a shift range is changed from a parking position to a neutral position during the change in the load of the main power source.

9. The control apparatus according to claim 8, wherein:
   the power transmission apparatus further includes an output-shaft connected motor that is connected to the output shaft of the electric differential portion; and
   the output-shaft rotational speed control portion controls the rotational speed of the output shaft to the predetermined rotational speed using the output-shaft connected motor.

10. The control apparatus according to claim 8, wherein the predetermined rotational speed is zero or substantially zero.

11. The control apparatus according to claim 8, wherein:
the power transmission apparatus further includes an engagement element that constitutes a part of a power transmission path between the electric differential portion and a drive wheel; and
the output-rotational speed control portion controls the rotational speed of the output shaft of the electric differential portion to the predetermined rotational speed, by engaging the engagement element to allow power to be transmitted between the output shaft of the electric differential portion and the drive wheel.

12. The control apparatus according to claim 11, wherein:
the power transmission apparatus further includes a shift portion provided in the power transmission path between the electric differential portion and the drive wheel; and
the engagement element is a constituent element of the shift portion.

13. The control apparatus according to claim 8, wherein:
the power transmission apparatus further includes a shift portion that is provided in a power transmission path between the electric differential portion and a drive wheel, and that includes a plurality of engagement elements; and
the output-shaft rotational speed control portion controls the rotational speed of the output shaft of the electric differential portion to zero or substantially zero, by locking an inner portion of the shift portion by engaging the engagement elements.

14. The control apparatus according to claim 8, wherein when the shift position or the shift range is the neutral position, the main power source is only idling, or the main power source is only operated using the motor.

15. The control apparatus according to claim 8, wherein the change in the load of the main power source is caused by a load operation of the main power source performed to charge an electric power storage device.

16. The control apparatus according to claim 8, wherein the change in the load of the main power source is caused by racing of the main power source due to depression of an accelerator pedal by a driver.

17. A method of controlling a power transmission apparatus for a vehicle, which includes an electric differential portion in which a difference between a rotational speed of an input shaft connected to a main power source and a rotational speed of an output shaft is controlled by controlling an operating state of a motor connected to a rotational element of a differential mechanism, the method comprising:

determining whether at least one of a shift position and a shift range is a parking position;
determining whether a load of the main power source is being changed, if it is determined the at least one of the shift position and the shift range is the parking position; and
controlling the rotational speed of the output shaft of the electric differential portion to a predetermined rotational speed, if it is determined that the load of the main power source is being changed.

18. The method according to claim 17, further comprising:
determining whether at least one of a control that starts the main power source and a control that stops the main power source is being executed, if it is determined that the load of the main power source is not being changed; and
controlling the rotational speed of the output shaft of the electric differential portion to the predetermined rotational speed, if it is determined the at least one of the control that starts the main power source and the control that stops the main power source is being executed.

19. The method according to claim 17, further comprising
determining whether at least one of the shift position and the shift range is a neutral position, when it is determined that neither the shift position nor the shift range is the parking position; and
determining whether at least one of a control that starts the main power source and a control that stops the main power source is being executed, if it is determined the at least one of the shift position and the shift range is the neutral position; and
controlling the rotational speed of the output shaft of the electric differential portion to the predetermined rotational speed, if it is determined the at least one of the control that starts the main power source and the control that stops the main power source is being executed.

20. The method according to claim 17, further comprising
determining whether at least one of the shift position and the shift range is changed from the parking position to the neutral position during a change in the load of the main power source;
determining whether the change in the load of the main power source ends, if it is determined the at least one of the shift position and the shift range is changed from the parking position to the neutral position; and
executing a control that is normally executed at the neutral position, if it is determined that the change in the load of the main power source ends.

* * * * *